US 12,131,352 B2

United States Patent
Zacharski et al.

(10) Patent No.: US 12,131,352 B2
(45) Date of Patent: *Oct. 29, 2024

(54) DYNAMIC HEADER BIDDING CONFIGURATION

(71) Applicant: CADENT, LLC, New York, NY (US)

(72) Inventors: Michael Zacharski, Pawling, NY (US); Alex E. Cook, Los Angeles, CA (US)

(73) Assignee: CADENT, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,748

(22) Filed: Feb. 14, 2022

(65) Prior Publication Data
US 2022/0253906 A1 Aug. 11, 2022

Related U.S. Application Data

(63) Continuation of application No. 15/669,633, filed on Aug. 4, 2017, now Pat. No. 11,250,476.

(51) Int. Cl.
*G06Q 30/02* (2023.01)
*G06Q 30/0241* (2023.01)
*G06Q 30/0273* (2023.01)

(52) U.S. Cl.
CPC ..... *G06Q 30/0275* (2013.01); *G06Q 30/0277* (2013.01)

(58) Field of Classification Search
CPC .............. G06Q 30/0275; G06Q 30/0277
See application file for complete search history.

(56) References Cited

U.S. PATENT DOCUMENTS

| 8,831,987 | B2 | 9/2014 | Knapp et al. |
| 8,983,859 | B2 | 3/2015 | Nice et al. |
| 2008/0065479 | A1 | 3/2008 | Tomlin et al. |
| 2008/0162329 | A1 | 7/2008 | Knapp |
| 2008/0228564 | A1 | 9/2008 | de Heer et al. |
| 2009/0157491 | A1* | 6/2009 | Brougher ........... G06Q 30/0273 705/14.69 |

(Continued)

OTHER PUBLICATIONS

Michalis Pachilakis, No More Chasing Waterfalls: A Measurement Study of the Header Bidding Ad-Ecosystem, p. 3 and 4 (Year: 2019) (Year: 2019).*

(Continued)

*Primary Examiner* — Ilana L Spar
*Assistant Examiner* — Darnell A Pouncil
(74) *Attorney, Agent, or Firm* — Rowan TELS LLC

(57) ABSTRACT

Dynamic header bidding configuration is disclosed. For example, ad slot entries associated with ad slots in a web content, further associated with ad identifiers and ad sizes are received. Header bidding partners associated with an ad slot entry are received, each partner associated with a parameter. The partners, parameters, ad slot entries, ad identifiers, and ad sizes are recorded as a configuration associated with the web content. A script associated with the configuration, further associated with a page of the web content including an ad slot associated with the ad slot entry is generated. The configuration is sent to a client device that invokes the script by loading the first page, and an ad from a partner is displayed in an ad impression of the ad slot on the client device based on a response to a notice sent to at least two partners.

21 Claims, 11 Drawing Sheets

(56) References Cited

U.S. PATENT DOCUMENTS

| | | | |
|---|---|---|---|
| 2009/0163186 A1* | 6/2009 | Gupta | G06Q 30/02 |
| | | | 455/414.2 |
| 2009/0298480 A1 | 12/2009 | Khambete et al. | |
| 2010/0114716 A1 | 5/2010 | Heilig | |
| 2010/0145809 A1 | 6/2010 | Knapp et al. | |
| 2010/0262498 A1* | 10/2010 | Nolet | G06Q 30/0251 |
| | | | 705/14.71 |
| 2011/0040635 A1 | 2/2011 | Simmons et al. | |
| 2013/0066705 A1 | 3/2013 | Umeda | |
| 2014/0006170 A1* | 1/2014 | Collette | G06Q 30/0277 |
| | | | 705/14.71 |
| 2014/0058849 A1 | 2/2014 | Saifee et al. | |
| 2014/0122253 A1* | 5/2014 | Vassilvitskii | G06Q 30/0275 |
| | | | 705/14.71 |
| 2014/0137188 A1 | 5/2014 | Bartholornay et al. | |
| 2015/0051986 A1 | 2/2015 | Saifee et al. | |
| 2015/0120468 A1 | 4/2015 | Knapp et al. | |
| 2015/0154650 A1 | 6/2015 | Umeda | |
| 2015/0310500 A1 | 10/2015 | Nolet et al. | |
| 2016/0104208 A1* | 4/2016 | Keiser | G06Q 30/0241 |
| | | | 705/14.71 |

OTHER PUBLICATIONS

B. Levine, Ad Exchange bRealTime Launches Biddr+ for Header Bidding, Jan. 19, 2017.

Amazon Web Services, Advertising Serving, May 2012.

Amazon Web Services, Building a Real-Time Bidding Platform on AWS, Feb. 2016, https://d0.awsstatic.com/whitepapers/Building_a_Real_Time_Bidding_Platform_on_AWS_v1_Final.pdf.

Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.

PCT Search Report and Written Opinion dated Oct. 29, 2018 issued for International PCT Application No. PCT/US18/44983 filed on Aug. 2, 2018.

Michalis Pachilakis, No More Chasing Waterfalls: A Measurement Study of the Header Bidding Ad-Ecosystem, p. 3 and 4 (Year: 2019).

* cited by examiner

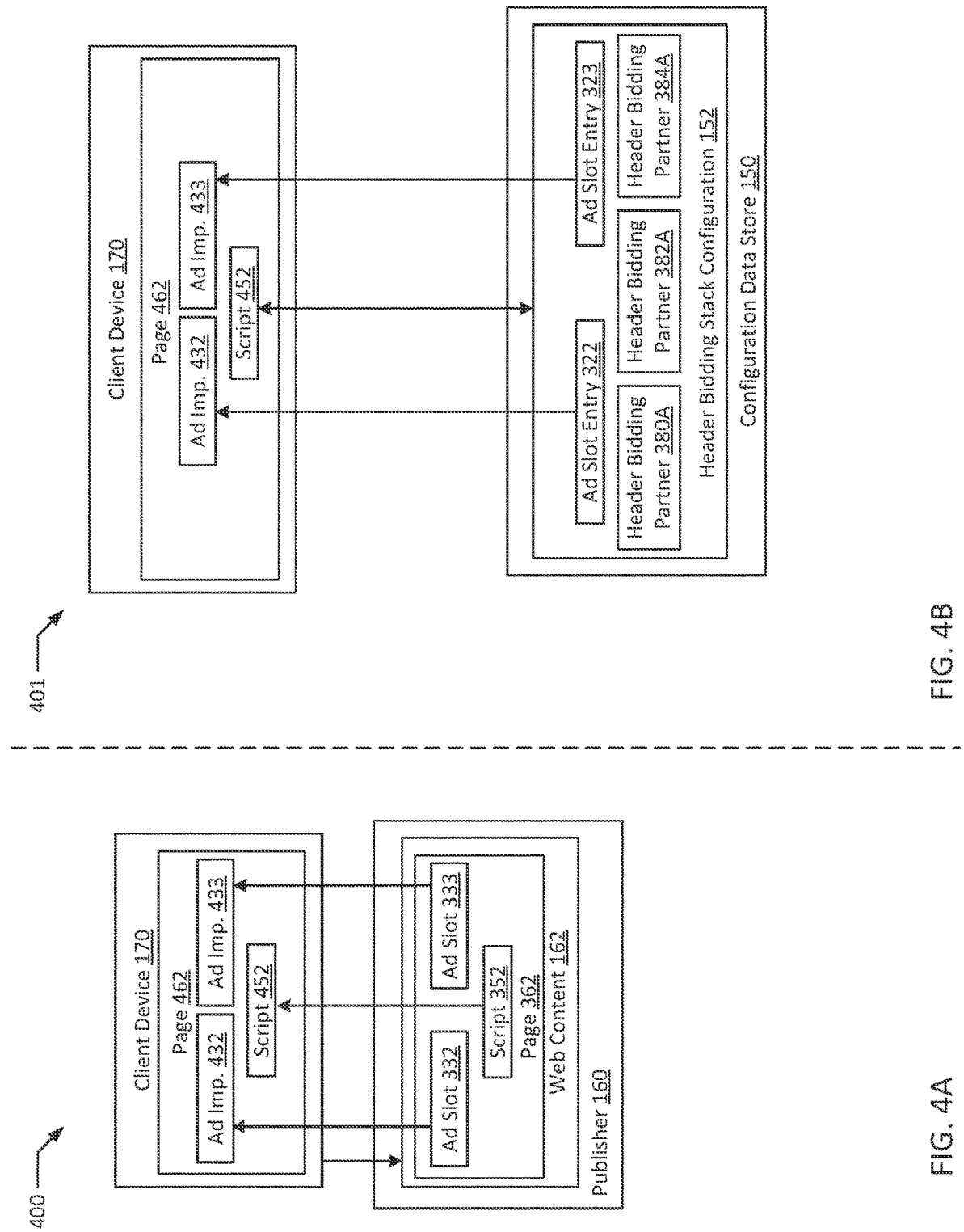

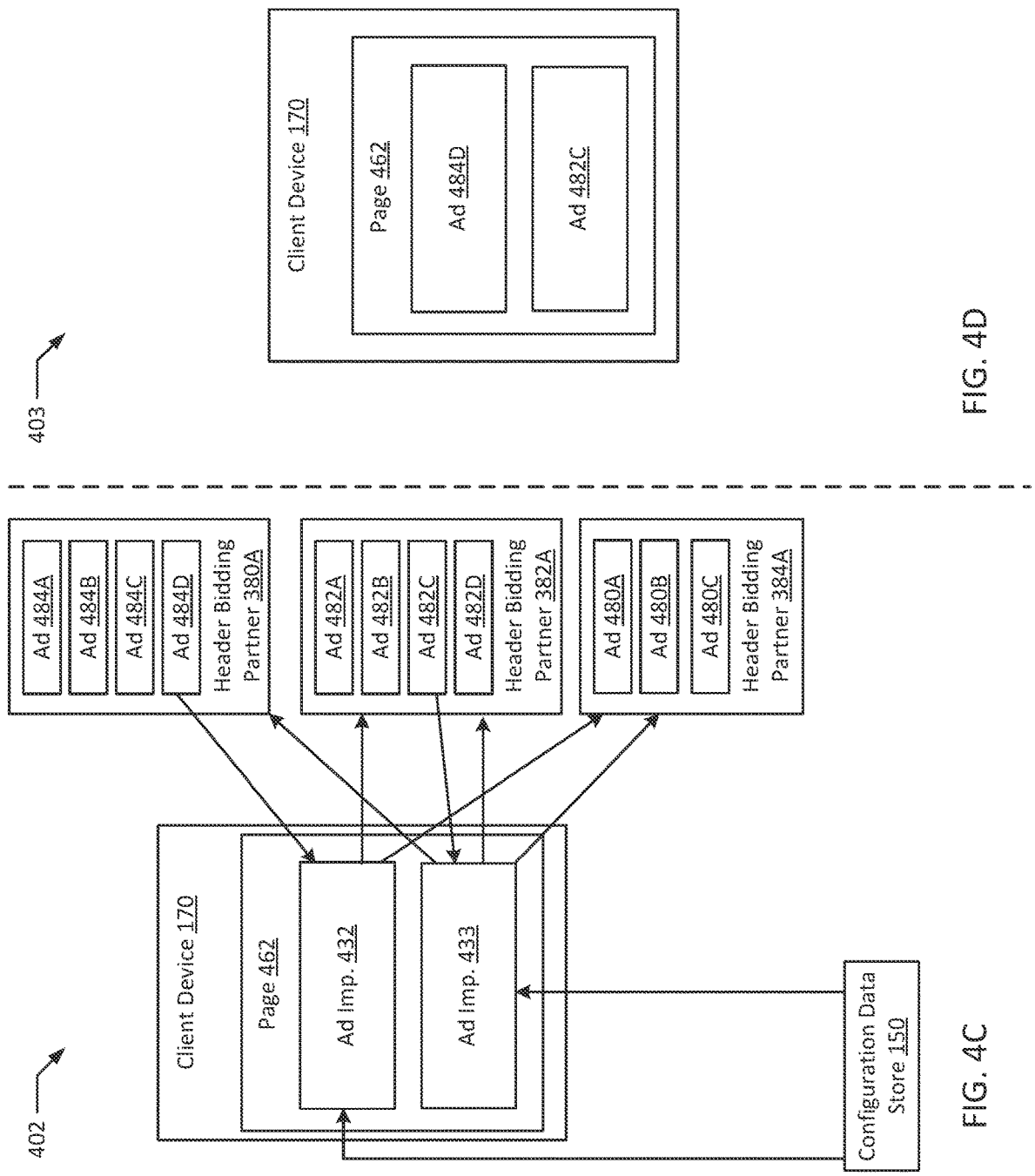

DYNAMIC HEADER BIDDING CONFIGURATION

CROSS-REFERENCE TO A RELATED APPLICATION AND PRIORITY CLAIM

The present application is a continuation application of U.S. patent application Ser. No. 15/669,633 filed on Aug. 4, 2017, entitled, "Dynamic Header Bidding Configuration", the entire disclosure of which is incorporated by reference herein in its entirety.

BACKGROUND

The present disclosure generally relates to advertising on network accessible devices. As microprocessors have become more efficient, and network connectivity more prevalent, an ever increasing amount of devices now have interne or intranet enabled capabilities and features. With the network capabilities of network accessible devices, come opportunities for users to consume content, and therefore opportunities for publishers of content to advertise to these users. Advertisers are presented with ever increasing opportunities to reach their increasingly accessible consumers through a myriad of network accessible devices used by these consumers on a daily basis. To maximize the value of each advertisement opportunity, it is typically advantageous for publishers of content to offer an advertisement opportunity to as many potential advertisers as feasible.

SUMMARY

The present disclosure provides a new and innovative system, methods and apparatus for dynamic header bidding configuration. In an example, a system of configuring header bidding advertisement slots includes a memory communicatively coupled with one or more processors connected to a network. A configurator executes on the one or more processors including a user interface module, a header bidding stack interpreter, and a script engine. The one or more processors execute to receive, by the user interface module, a plurality of ad slot entries associated with a respective plurality of ad slots in a web content, where each ad slot of the plurality of ad slots is associated with a respective ad identifier and a respective ad size. The user interface module receives a first plurality of header bidding partners associated with a first ad slot entry of the plurality of ad slots entries, where each header bidding partner of the first plurality of header bidding partners is associated with at least one respective header bidding partner parameter. The header bidding stack interpreter records the first plurality of header bidding partners, the at least one respective header bidding partner parameter associated with each header bidding partner of the first plurality of header bidding partners, the plurality of ad slot entries, the respective ad identifier associated with each ad slot of the plurality of ad slots, and the respective ad size associated with each ad slot of the plurality of ad slots as a header bidding stack configuration associated with the web content. The script engine generates a script associated with the header bidding stack configuration, where the script is associated with a first page of the web content and the first page includes a first ad slot of the plurality of ad slots associated with the first ad slot entry. The header bidding stack configuration is sent to a client device based on the client device requesting the first page thereby invoking the script by loading the first page, where a first ad from a first header bidding partner of the first plurality of header bidding partners is displayed in a first ad impression of the first ad slot on the client device based on a response to a first ad impression notice sent to at least two header bidding partners of the first plurality of header bidding partners.

Additional features and advantages of the disclosed method and apparatus are described in, and will be apparent from, the following Detailed Description and the Figures.

BRIEF DESCRIPTION OF THE FIGURES

FIGS. 4A-4D are block diagrams of an ad configured with dynamic header bidding configuration being displayed on a client device according to an example of the present disclosure.

DETAILED DESCRIPTION OF EXAMPLE EMBODIMENTS

Figure 1:
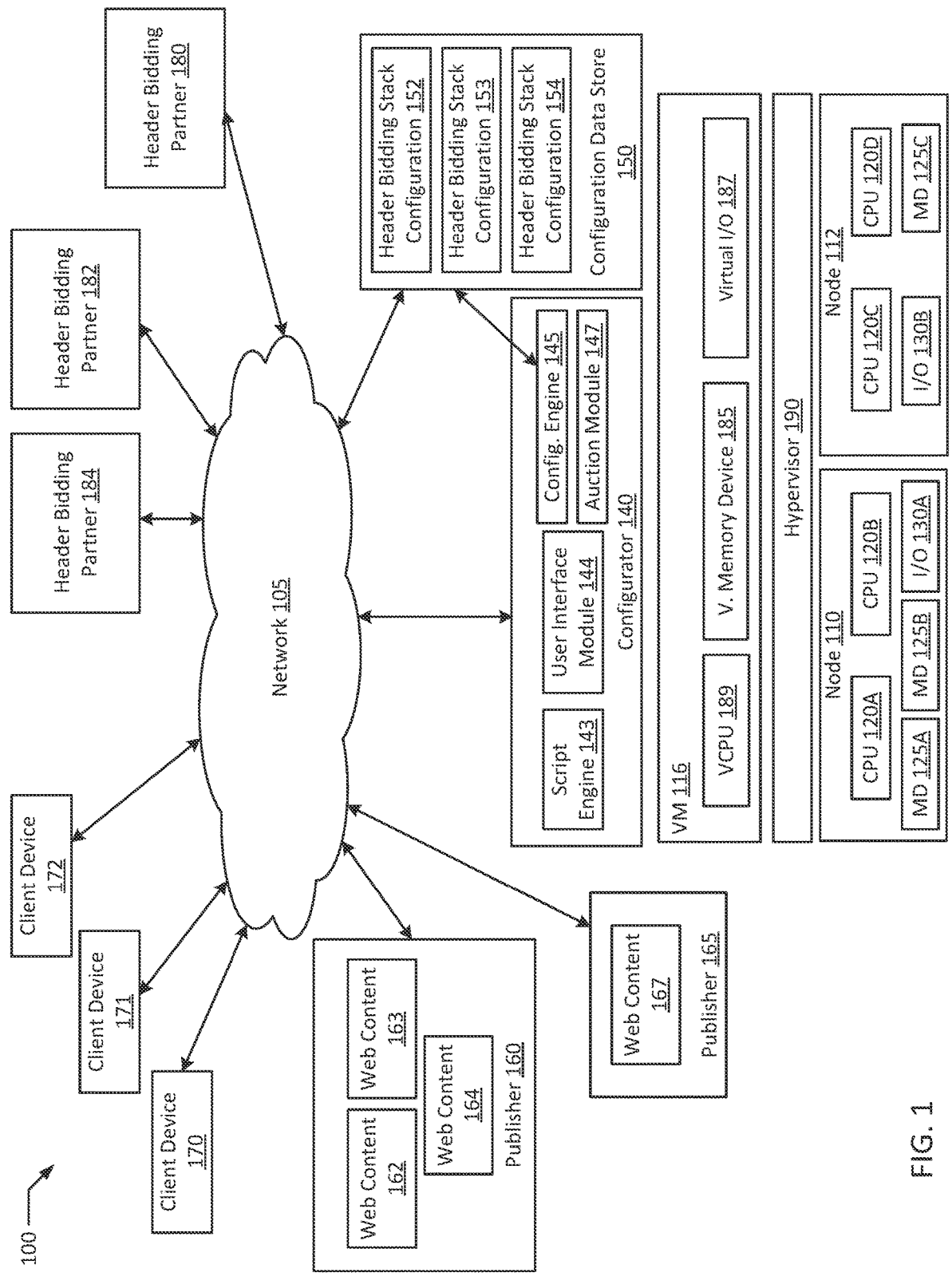
FIG. 1 is a block diagram of a system performing dynamic header bidding configuration according to an example of the present disclosure.

As network accessible devices increasingly gain popularity, opportunities to advertise on such network accessible devices increase. With the vast variety of devices capable of presenting audio and visual advertisements ("ads"), comes numerous opportunities to display ads, and also competition for the advertising opportunities or ad impressions. Typically, a publisher serving content may coordinate with advertisers using a bidding process to display ads in content served to consumers of the publisher's content. A page of content, such as a web page on a web site, may include multiple ad slots where ads may be displayed. In an example, each ad slot, when loaded to a client device and viewed by a user of the client device may result in an ad impression. An ad impression may be an opportunity for an advertiser to reach a given user at a given time, and therefore each time a user loads a given page of content, and/or each time a different user loads the page of content, each ad slot on the page may become a new ad impression. In an example, a publisher may therefore request for advertisers to bid on each ad impression to maximize the value of the ad impression. For advertisers, ad agencies, and/or ad exchanges, response time to requests for bids may therefore be critical for maximizing both the likelihood of securing an ad impression as well as the effectiveness of a given ad impression. As users typically expect perceivably immediate responses when accessing content online, the entire process for negotiating, selecting, and displaying an ad may typically be completed in under one second. In a typical day, billions of ads may be served to consumers on network accessible devices. Publishers may be incentivized to maximize the advertisers bidding on each of their ad impressions to generate maximum value from each impression.

In a typical advertising exchange implementation, a user on a network accessible client device may access content supplied by a publisher. The publisher may incorporate ad slots in the content, and then seek prospective buyers (e.g., advertisers) for the ad impressions in the content in real-time while the content is loading, for example, by broadcasting an ad request for each ad slot loaded to the client device as an ad impression. An ad agency may, upon receipt of a request to bid on a given ad slot, seek advertisers either directly or through an advertising exchange to purchase the ad slot. For example, header bidding may be a typical implementation by which publishers and ad agencies request bids for and subsequently serve advertisements. A typical header bidding implementation may be based on the open source project Prebid.js where a typical request for bids on an ad slot may be in the form of a hypertext transfer protocol ("HTTP") GET request with query string parameters related to the particular ad slot, such as a tag id, a referrer, and a size of the ad impression. For example, a header bid request may be in the form of a Uniform Resource Locator ("URL") without an additional message payload such as, http://www.example.com/getBid?tagid=55&referrer=mysite.com&width=300&height=250. In an example, an HTTP header associated with a request may include additional information pertinent to the request, such as User Agent, Content Type, Content Length, etc. In an example, requests for bids on an ad slot may also be in the form of an HTTP POST request. For example, in implementations based on the open source project OpenRTB, a bid may be in the form of an HTTP POST request with a JavaScript Object Notation ("JSON") payload. A typical JSON payload for an ad slot bid may include attribute-value pairs conveying information regarding the particular ad slot, such as, {"tagid": "55", "referrer": "mysite.com", "dimensions": {"width": "300", "height": "250"}}. In various examples, different publishers and advertisers may implement different preferred formats of advertisement requests.

In an example, to maintain a positive user experience for the content, a publisher may require response from potential advertisers, ad agencies, and/or ad exchanges within a certain critical time threshold. In an example, network latency may account for a significant proportion of the time spent handling a given request. Another significant source of latency may be the time a downstream actor (e.g., an advertiser seeking to advertise through an ad exchange) takes to respond to a given request. Some sources of latency may typically be outside of the control of a given actor. In an example, a balance may be struck between how many advertisers each ad impression is shopped to by a publisher and the resulting latency from waiting for responses from each advertising partner.

In a typical example, a publisher may configure bidding settings for each ad slot in each page of the web content provided by the publisher manually through updates to the code of the web content (e.g., html code of a web site, source code of a game). Typically, header bidding is conducted by the client device, and therefore both the bidding logic and configuration may be loaded to the client device as part of a page of content being loaded. In an example, updating a header bidding setting, such as adding or removing a given advertiser, may require a code change and maintenance downtime of the web content commensurate with a change to the content itself. The benefits of such an update may well be outweighed by the costs (e.g., software engineer time, website downtime, risk of introducing bugs or errors) in many situations. For example, an outage of one advertiser's systems may result in each page including that advertiser as a bidder reaching a timeout for the advertiser (e.g., one second) before the page may load. In such a scenario, thousands of content consumers may be impacted by having up to 700-800 ms added to their loading times costing the publisher significant goodwill of the consumers of the publisher's content. However, unless the outage is known to likely persist for a relatively extended period of time, a publisher may find that scheduling downtime of their web content to remove the advertiser may be more detrimental than helpful. In addition, requiring downtime to update advertisement settings may result in significant lost opportunities if advertisement changes are delayed to the next scheduled downtime of the web content.

The present disclosure aims to address the inefficiencies caused by typical advertisement bidding implementations that require downtime for configuration updates by enabling dynamic header bidding configuration. In an example, by decoupling advertisement configurations from the source code of a page, and instead hosting the configurations remotely in a configurator, a publisher may update a configuration without incurring downtime to update the source code of their web content. For example, a malfunctioning advertiser may be temporarily removed and then reinstituted at will, in moments. Moving the storage site of configurations also enables further efficiencies in the bidding process, as parts of the bidding process may also be moved away from the client device, and may instead by handled server side by services collocated with the configurator, thereby achieving performance gains in the form of reduced latency and increased bidding targets for an ad impression. In an example, instead of embedding the logic and configuration for header bidding for each ad slot on a page, a script may be generated by a configurator for the page and associated with a configuration for the web content. When the page is loaded by a client device, the script may then execute to conduct the advertisement bidding process in conjunction with the remotely stored configuration. In an example, the script may further incorporate forms of advertisement bidding beyond client device based header bidding. In an example, a single configuration may be shared by multiple pages of the same web content for ease of configuration management. In such examples, potential instances of human error from updating the source code of multiple pages manually may also be significantly reduced.

FIG. 1 is a block diagram of a system performing dynamic header bidding configuration according to an example of the present disclosure. In an example, illustrated system 100 depicts the various key parties in a given advertisement exchange. For example, a publisher (e.g., publishers 160 and 165) may typically provide web contents (e.g., web contents 162, 163, 164, and 167) to client devices (e.g., client devices 170-172) in which advertisements from header bidding partners (e.g., header bidding partners 180, 182, and 184) are displayed over a network 105. In an example, dynamic header bidding configuration may be enabled and performed by configurator 140, including script engine 143, user interface module 144, configuration engine 145, and auction module 147. In an example, configuration data store 150 may be a separate component from configurator 140. In another example, configuration data store 150 may be a part of configurator 140. In an example, configurator 140 and/or configuration data store 150 may execute on a virtual machine ("VM") 116 that is hosted by a hypervisor 190 which executes on one or more of a plurality of hardware nodes (e.g., nodes 110 and 112).

In an example, network 105 may be any type of network, for example, a public network (e.g., the Internet), a private network (e.g., a local area network (LAN) or wide area network (WAN)), or a combination thereof. In an example, devices connected through network 105 may be interconnected using a variety of techniques, ranging from a point-to-point processor interconnect, to a system area network, such as an Ethernet-based network. In an example, configurator 140, including script engine 143, user interface module 144, configuration engine 145, and auction module 147 may execute on any virtualized or physical hardware connected to network 105. In an example, client devices 170-172 may be any form of network accessible device (e.g., phone, tablet, laptop, desktop, server, Internet of Things ("IOT") device, etc.).

In an example, configurator 140, including script engine 143, user interface module 144, configuration engine 145, and auction module 147 executes on VM 116 which executes on nodes 110 and/or 112. The system 100 may include one or more interconnected hosts (e.g., nodes 110 and 112). Each of nodes 110 and 112 may in turn include one or more physical processors (e.g., CPU 120A-D) communicatively coupled to memory devices (e.g., MD 125A-C) and input/output devices (e.g., I/O 130A-B). As used herein, physical processor or processors (Central Processing Units "CPUs") 120A-D refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-C refers to a volatile or non-volatile memory device, such as RAM, ROM, EEPROM, or any other device capable of storing data. Each node may also include input/output ("I/O") devices (e.g., I/O 130A-B) capable of providing an interface between one or more processor pins and an external device, the operation of which is based on the processor inputting and/or outputting binary data. CPUs 120A-D may be interconnected using a variety of techniques, ranging from a point-to-point processor interconnect, to a system area network, such as an Ethernet-based network. Local connections within each of nodes 110 and 112, including the connections between a processor 120A and a memory device 125A-B and between a processor 120A and a I/O 130A may be provided by one or more local buses of suitable architecture, for example, peripheral component interconnect (PCI).

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor or a component (e.g., a virtual machine manager) that executes tasks commonly executed by hypervisors to allocate physical resources to the virtual machine. In an example, VM 116 may be a virtual machine executing on top of physical hosts (e.g., nodes 110 and 112), possibly with a hypervisor 190 executing between the virtualized layer and the physical hosts. In an example, configurator 140, including script engine 143, user interface module 144, configuration engine 145, and/or auction module 147 may be further virtualized (e.g., in a container).

System 100 may run one or more VMs (e.g., VM 116) by executing a software layer (e.g., hypervisor 190) above the hardware and below the VM 116, as schematically shown in FIG. 1. In an example, the hypervisor 190 may be a component of a host operating system executed by the system 100. In another example, the hypervisor 190 may be provided by an application running on the host operating system, or may run directly on the nodes 110 and 112 without an operating system beneath it. The hypervisor 190 may virtualize the physical layer, including processors, memory, and I/O devices, and present this virtualization to VM 116 as devices, including virtual processor ("VCPU") 189, virtual memory device 185, and virtual I/O ("VI/O") 187.

In an example, a VM 116 may be a virtual machine and may execute a guest operating system which may utilize the underlying virtual central processing unit ("VCPU") 189, virtual memory device ("V. Memory Device") 185, and virtual I/O 187. Configurator 140, including script engine 143, user interface module 144, configuration engine 145, and/or auction module 147 may run as applications on VM 116 or may be further virtualized and execute in containers. Processor virtualization may be implemented by the hypervisor 190 scheduling time slots on one or more physical processors (e.g., CPU 120A-D) such that from the guest operating system's perspective those time slots are scheduled on a virtual processor 189. In an example, VCPU 189 may be bound to execute on a specific physical processor in nodes 110 or 112. For example, instructions for VCPU 189 may execute on CPU 120A.

A VM 116 may run on any type of dependent, independent, compatible, and/or incompatible applications on the underlying hardware and host operating system. In an example, configurator 140, including script engine 143, user interface module 144, configuration engine 145, and/or auction module 147 running on VM 116 may be dependent on the underlying hardware and/or host operating system. In another example, configurator 140, including script engine 143, user interface module 144, configuration engine 145, and/or auction module 147 running on VM 116 may be independent of the underlying hardware and/or host operating system. In an example, configurator 140, including script engine 143, user interface module 144, configuration engine 145, and/or auction module 147 running on VM 116 may be compatible with the underlying hardware and/or host operating system. Additionally, configurator 140, including script engine 143, user interface module 144, configuration engine 145, and/or auction module 147 may be incompatible with the underlying hardware and/or OS. In an example, configurator 140, including script engine 143, user interface module 144, configuration engine 145, and/or auction module 147 may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). The hypervisor 190 may manage memory for the host operating system as well as memory allocated to the VM 116 and guest operating systems.

In an example, configuration data store 150 may be any form of suitable storage system for header bidding stack configurations (e.g., header bidding stack configurations 152-154), for example, a relational database. The configuration data store 150 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, configuration data store 150 may be stored in a database organized as a formal database with a schema such as a relational schema with defined tables, indices, links, triggers, various commands etc. In some examples, configuration data store 150 may not be organized as a formal database, but may instead be an alternative storage structure capable of holding the information stored in ASDBs configuration data store 150, including but not limited to a file, folder, directory, registry, array, list, etc.

In an example, publishers 160 and 165 may be entities that provide consumable content (e.g., web content 162-164, 167) over network 105 to client devices 170-172. In an example, publisher 160 may be a news conglomerate with a world news site (e.g., web content 162), a sports news site (e.g., web content 163), and a celebrity gossip site (e.g., web content 164). In an example, publisher 165 may be an online gaming company with an online game supported by ads (e.g., web content 167). In an example, header bidding stack configuration 152 may be associated with web content 162, header bidding stack configuration 153 may be associated with web content 163, and header bidding stack configuration 154 may be associated with web content 164, each header bidding stack configuration (e.g., header bidding stack configurations 152-154) including configuration information for ad slots in their respective web content (e.g., web contents 162-164). In an example, header bidding partners 180, 182, and 184 may be three different advertisers or groups of advertisers that bid on advertisements in one or more of web content 162-164 and 167.

Figure 2:
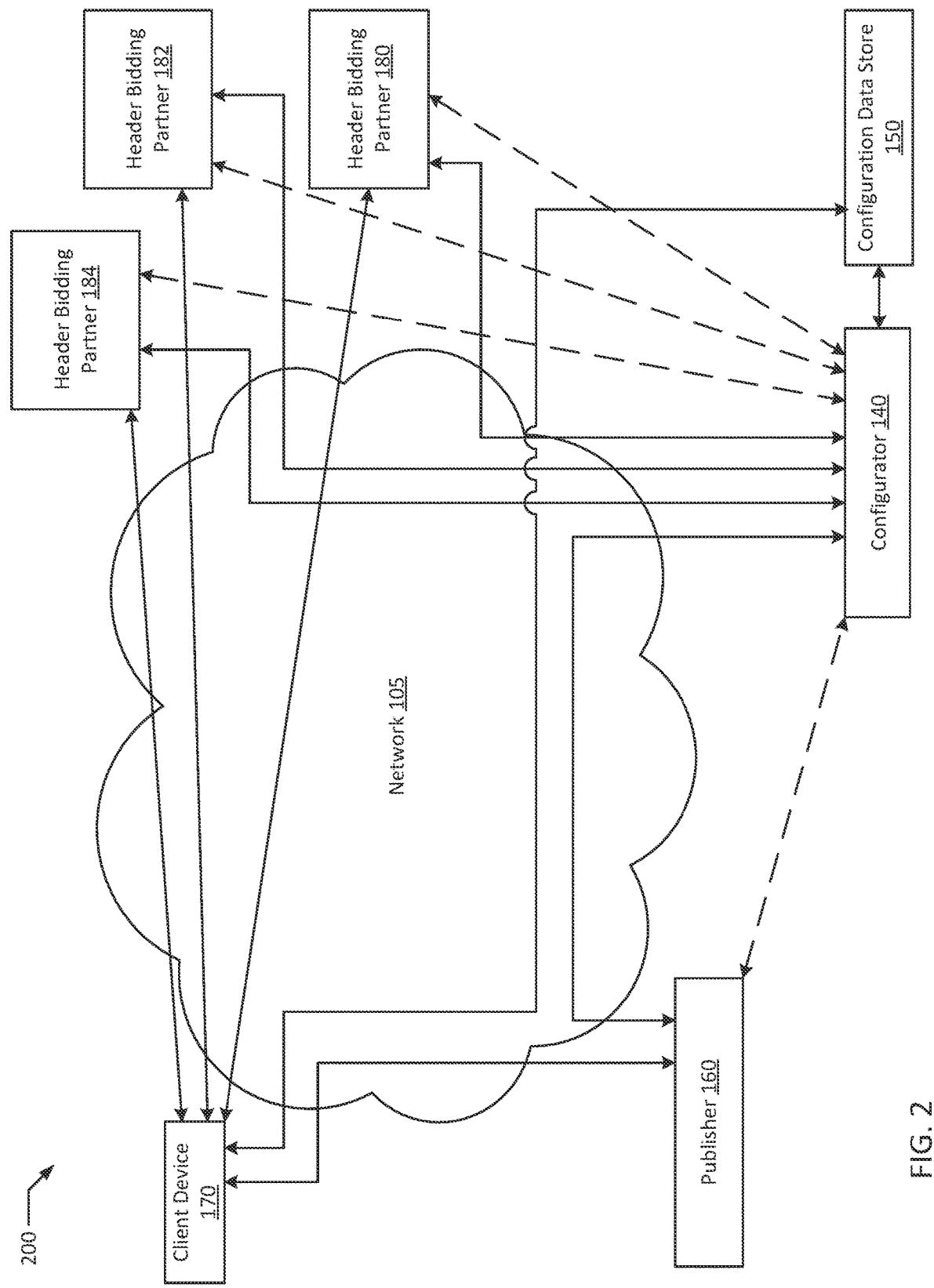
FIG. 2 is a block diagram of network connectivity between parties in a system performing dynamic header bidding configuration according to an example of the present disclosure.

FIG. 2 is a block diagram of network connectivity between parties in a system performing dynamic header bidding configuration according to an example of the present disclosure. In an example, publisher 160 may generate a header bidding stack configuration 152 using configurator 140 for web content 162 provided by publisher 160. In the example, header bidding stack configuration 152 may be stored on configuration data store 150 and may include header bidding partners 180, 182, and 184 as header bidding partners for a breaking news page of web content 162 (e.g., a world news site). In an example, when client device 170 retrieves the breaking news page of web content 162 from publisher 160, a script associated with header bidding stack configuration 152 generated by configurator 140 may be embedded in the breaking news page by publisher 160. In the example, the script is invoked by loading the breaking news page of web content 162, resulting in header bidding stack configuration 152 being retrieved by client device 170 from configuration data store 150. Based on header bidding stack configuration 152, client device 170 may then contact one or more of header bidding partners 180, 182, and 184 for each ad slot on the breaking news page and may display an ad from one of header bidding partners 180, 182, or 184 in each ad slot. In an example, an ad may also be displayed from another ad partner through a separate bidding process (e.g., a server side auction conducted by publisher 160 and/or configurator 140).

In an example, network 105 may be a public network (e.g., the internet). In the example, configurator 140 may be collocated with one or more of publisher 160 and header bidding partners 180, 182, and 184. In an example, collocation may allow for lower latency access by the configurator 140 to publisher 160 and/or header bidding partners 180, 182, and 184, for example, over a local area network. In an example, configurator 140 may be configured to request bids from one or more of header bidding partners 180, 182, and 184 and then provide the resulting high bid to client device 170, for example, via auction module 147, instead of having client device 170 contact all of header bidding partners 180, 182, and 184 directly.

Figure 3:
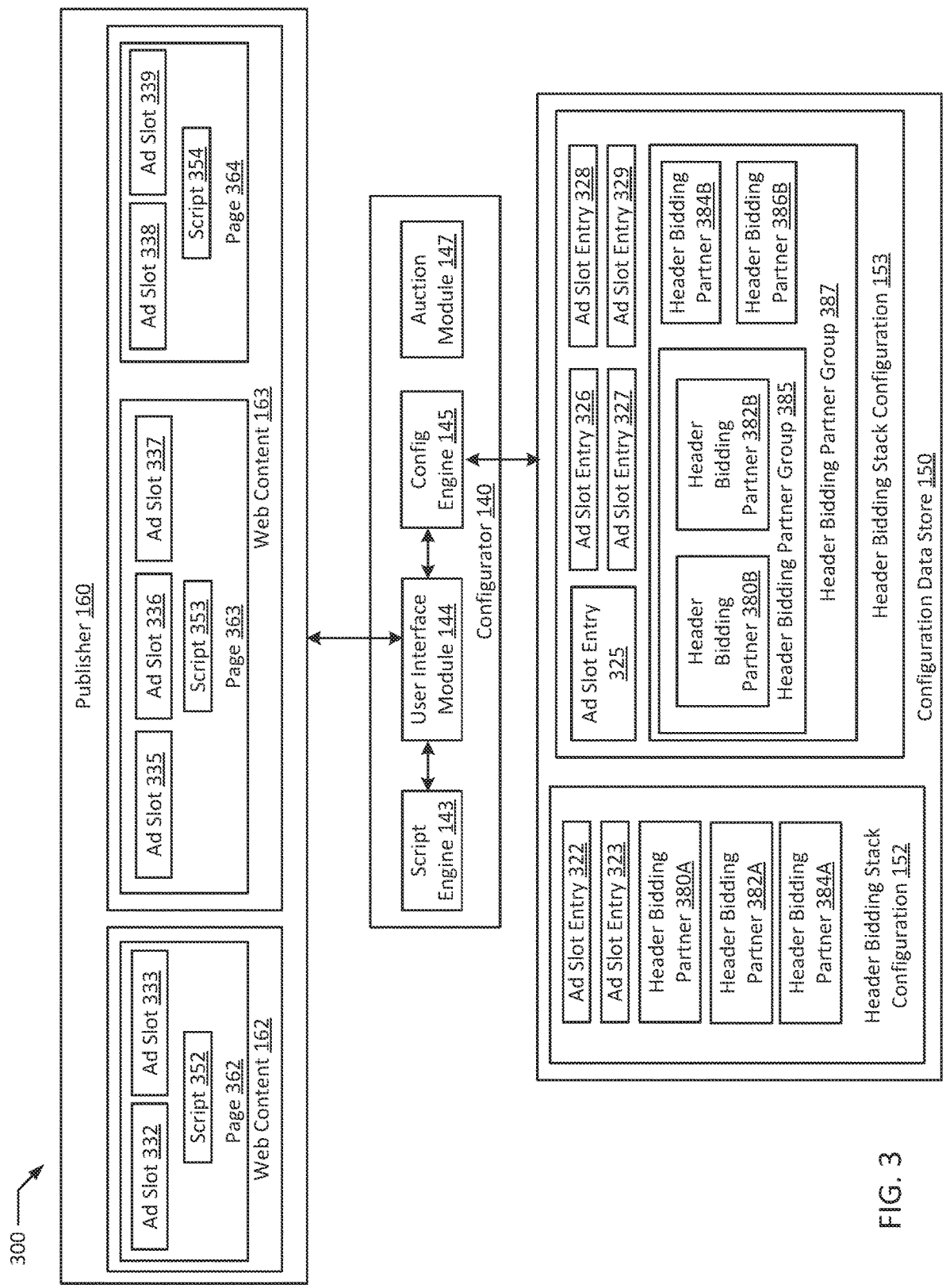
FIG. 3 is a block diagram of a publisher configuring an advertisement slot with dynamic header bidding configuration according to an example of the present disclosure.

FIG. 3 is a block diagram of a publisher configuring an advertisement slot with dynamic header bidding configuration according to an example of the present disclosure. In an example, publisher 160 may configure advertisements for web content 162 (e.g., a world news site) and web content 163 (e.g., a sports site) using configurator 140. In an example, web content 162 may include page 362 (e.g., a breaking news page), while web content 163 may include page 363 (e.g., a daily highlights page) and page 364 (e.g., an injury update page). In an example, page 362 may include an ad slot 332 (e.g., a banner ad) and ad slot 333 (e.g., a video ad). In an example, ad slots 335 and 338 may also be banner ads while ad slots 336 and 339 may be additional video ads, and ad slot 337 may be a side bar image ad. In an example, publisher 160 may access configurator 140 via user interface module 144, which may provide any form of suitable interface for generating header bidding stack configurations 152 and 153 (e.g., graphical user interface, command line interface). In an example, header bidding stack configuration 152 may be associated with web content 162 while header bidding stack configuration 153 may be associated with web content 163. In an example, configuration engine 145 may create and update header bidding stack configurations 152 and 153 in configuration data store 150 based on input from user interface module 144.

In an example, header bidding stack configuration 152 may be configured with three header bidding partners (e.g., header bidding partners 380A, 382A, 384A), and ad slot entry 322 associated with ad slot 332 may be configured to request bids from one or more of header bidding partners 380A, 382A, 384A, while ad slot entry 323 associated with ad slot 333 may be configured to request bids from the same header bidding partners (e.g., header bidding partners 380A, 382A, 384A) as ad slot entry 322 or ad slot entry 323 may be associated with a different subset of header bidding partners (e.g., header bidding partners 382A and 384A). Similarly, header bidding stack configuration 153 associated with web content 163 may be configured with ad slot entries 325-329 associated with respective ad slots 335-339. In an example, header bidding partners 380B and 382B may be included in a header bidding partner group 385, while header bidding partners 380B, 382B, 384B, and 386B may all be included in a header bidding partner group 387. In an example, ad slot entries 325 and 328 may be configured to request bids from header bidding partner group 385 while ad slot entries 326, 327, and 329 may be configured to request bids from header bidding partner group 387. In an example, header bidding partners 380A-B may be the same header bidding partner as header bidding partner 180. In an example, script engine 143 may generate script 352 for web content 162 embedded in page 362 based on header bidding stack configuration 152. In an example, script engine 143 may generate script 353 for web content 163 embedded in page 363 and script 354 embedded in page 364 based on header bidding stack configuration 153. In an example, script 353 and script 354 may be the same script. In an example, script 353 and script 354 may be different scripts, for example, where script 354 is associated with a different header bidding stack configuration (e.g., not header bidding stack configuration 153). In an example, different pages (e.g., pages 363, 364) on the same web content 163 may share a header bidding stack configuration 153 for ease of configuration, but may also be configured with different header bidding stack configurations for greater control over specific ad features of each page (e.g., pages 363 and 364). In an example, a smaller header bidding stack configuration may provide latency and bandwidth advantages for a client device loading the header bidding stack configuration, so separate configurations for separate pages where unused components are eliminated may load somewhat faster on a client device (e.g., client devices 170, 172, 174).

FIGS. 4A-4D are block diagrams of an ad configured with dynamic header bidding configuration being displayed on a client device according to an example of the present disclosure. In illustrated system 400 depicted in FIG. 4A, client device 170 begins retrieving page 362 (e.g., the breaking news page) of web content 162 from publisher 160. In an example, page 362 includes ad slots 332 and 333 as well as script 352. In an example, client device 170 may load a copy of page 362 (e.g., page 462). In the example, an ad slot (e.g., ad slots 332, 333) on page 362 that is loaded to a client device (e.g., client device 170) may be ready to be consumed by a user of client device 170 and may therefore be an ad impression (e.g., ad impressions 432, 433) of the respective ad slot (e.g., ad slots 332, 333). In an example, script 452 is a local copy of script 352 on client device 170 retrieved from publisher 160.

In illustrated system 401 depicted in FIG. 4B, script 452 may be executed by client device 170, thereby retrieving header bidding stack configuration 152 from configuration data store 150 to client device 170. In an example, ad slot entry 322 may include configuration information for ad impression 432, including that ad slot entry 322 is bid on by header bidding partners 380A and 382A, while ad slot entry 323 may include configuration information for ad impression 433, including that ad slot entry 323 is bid on by header bidding partners 380A, 382A, and 384A. In an example, header bidding stack configuration 152 may include only configuration information that client device 170 interprets to conduct bidding for ad impressions 432 and 433. For example, a browser on client device 170 or script 452 may include interpretation instructions for header bidding stack configuration 152. In another example, header bidding stack configuration 152 may be an independently executable file, such as another script, that includes both the execution logic as well as the configuration information for conducting bidding for ad impressions 432-433.

In illustrated system 402 depicted in FIG. 4C, client device 170 conducts auctions (e.g., header bidding auctions) for ad impressions 432 and 433 based on header bidding stack configuration 152 retrieved from configuration data store 150. In an example, both ad impression 432 and ad impression 433 are configured to request bids from each of header bidding partners 380A, 382A, and 384A. In an example, client device 170 sends an ad impression notice to each of header bidding partners 380A, 382A, and 384A with information regarding ad impressions 432 and 433 to solicit bids. In another example, separate ad impression notices may be sent for different ad impressions (e.g., ad impression 432 and 433). In an example, an ad impression notice may include an identifier for the ad impression along with descriptive information such as the size of the ad impression and the type of ad running in the ad impression. In an example, the ad impression notice may further include user identifying information for a user of client device 170, such as a cookie, and/or information relating to the content of page 462 that may influence the bidding of the various header bidding partners 380A, 382A, and 384A. For example, header bidding partner 380A may represent financial advisors and may pay more based on the user of client device 170 having a high net worth, or based on page 462 displaying a financial headline. In the example, 484A-D may be for various companies providing investment advice, and header bidding partner 384A may win ad impression 432 for ad 484D offering private banking services for high net worth individuals. In an example, header bidding partner 382A may represent sporting brands. For example, ad 482A may be for baseball equipment, ad 482B may be for running shoes, ad 482C may be for golf clubs, and ad 482D may be for skateboards. In the example, based on the demographic of the user of client device 170 and the contents of page 462, header bidding partner 382A may place a high bid for the golf club ad 482C and win ad impression 433. In an example, header bidding partner 380A may represent various fast food and snack products, and may lose the bidding on both ad impressions 432 and 433. For example, header bidding partner 380A may have historical data showing a low conversion rate for high net worth individuals reading financial news. As depicted in system 403 in FIG. 4D, after conducting the header bidding auction, client device 170 may display the completed breaking news page on page 462 with ad 484D offering private banking services and ad 482C offering golf clubs.

Figure 5B:
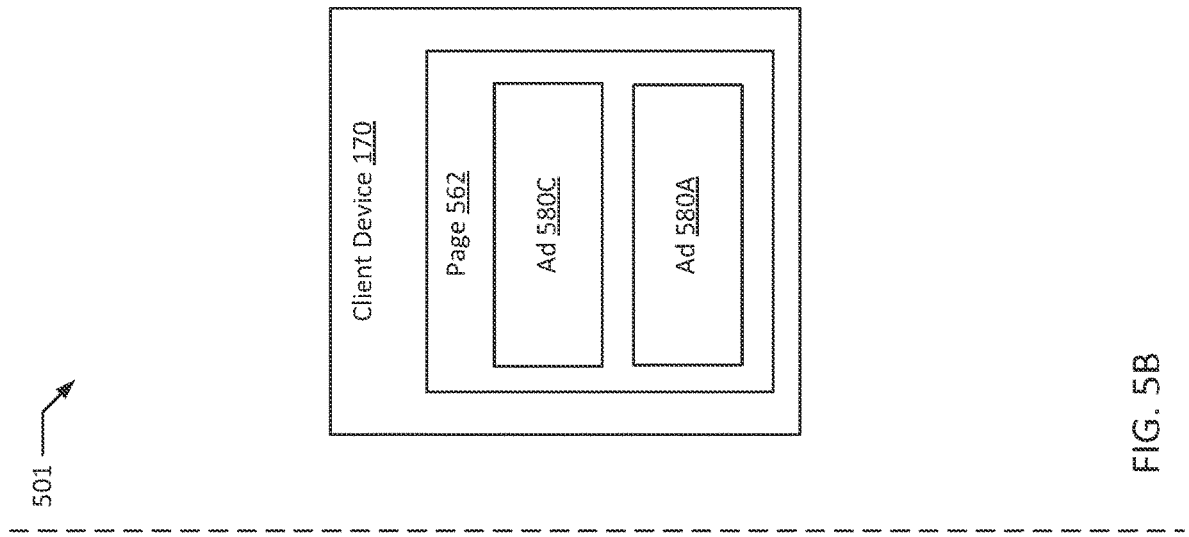
FIGS. 5A-5B are block diagrams of an ad configured with dynamic header bidding configuration with a secondary auction being displayed on a client device according to an example of the present disclosure.
Figure 5A:
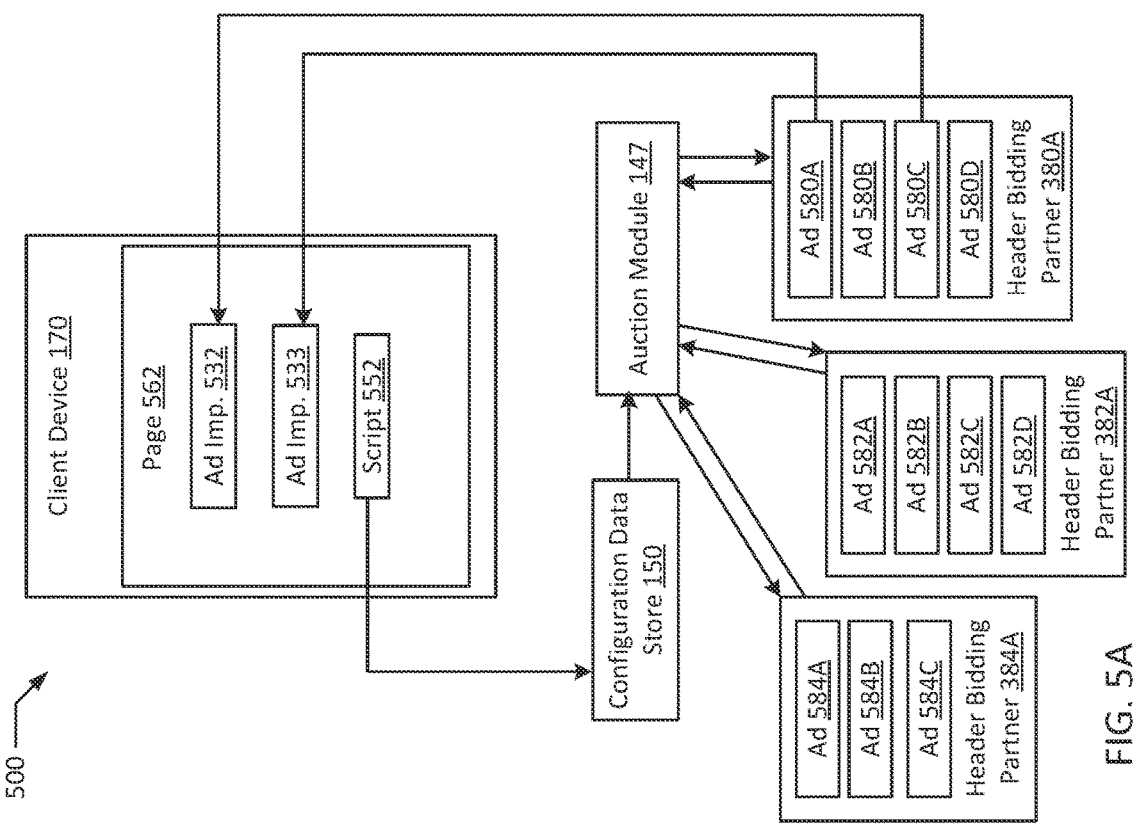

FIGS. 5A-5B are block diagrams of an ad configured with dynamic header bidding configuration with a secondary auction being displayed on a client device according to an example of the present disclosure. In an example, system 500 depicted in FIG. 5A may be an alternative embodiment of system 400 depicted in FIG. 4A. In an example, page 562 may also be the breaking news page of web content 162 loaded by client device 170. However, in system 500, when script 552 associated with page 562 is invoked by client device 170, the associated configuration in configuration data store may be configured to conduct a server side auction by auction module 147 rather than a client side auction by client device 170. In an example, auction module 147 may send ad impression notices for ad impressions 532 and 533 to each of header bidding partners 380A, 382A, and 384A. In the example, header bidding partner 380A may again represent fast food and snack foods, header bidding partner 382A may again represent sports companies, and header bidding partner 384A may again represent financial services companies. In an example, the breaking news on page 562 may be an article about a large, upcoming sporting event. In the example, header bidding partner 380A may outbid all of the competition (e.g., ads 582A-D of header bidding partner 382A, and ads 584A-C of header bidding partner 384A), to display ad 580A for a pizza and buffalo wing chain and ad 580 for potato chips in ad impressions 532 and 533. In an example, ads 580B for a fast casual chain and 580D for a burger chain may be determined to not fit the content of the page as well as more party friendly ads 580A and 580C. As depicted in system 501 in FIG. 5B, after conducting the header bidding auction, client device 170 may display the completed breaking news page on page 562 with ad 580A offering pizza and wings and ad 580C offering potato chips.

Figure 6:
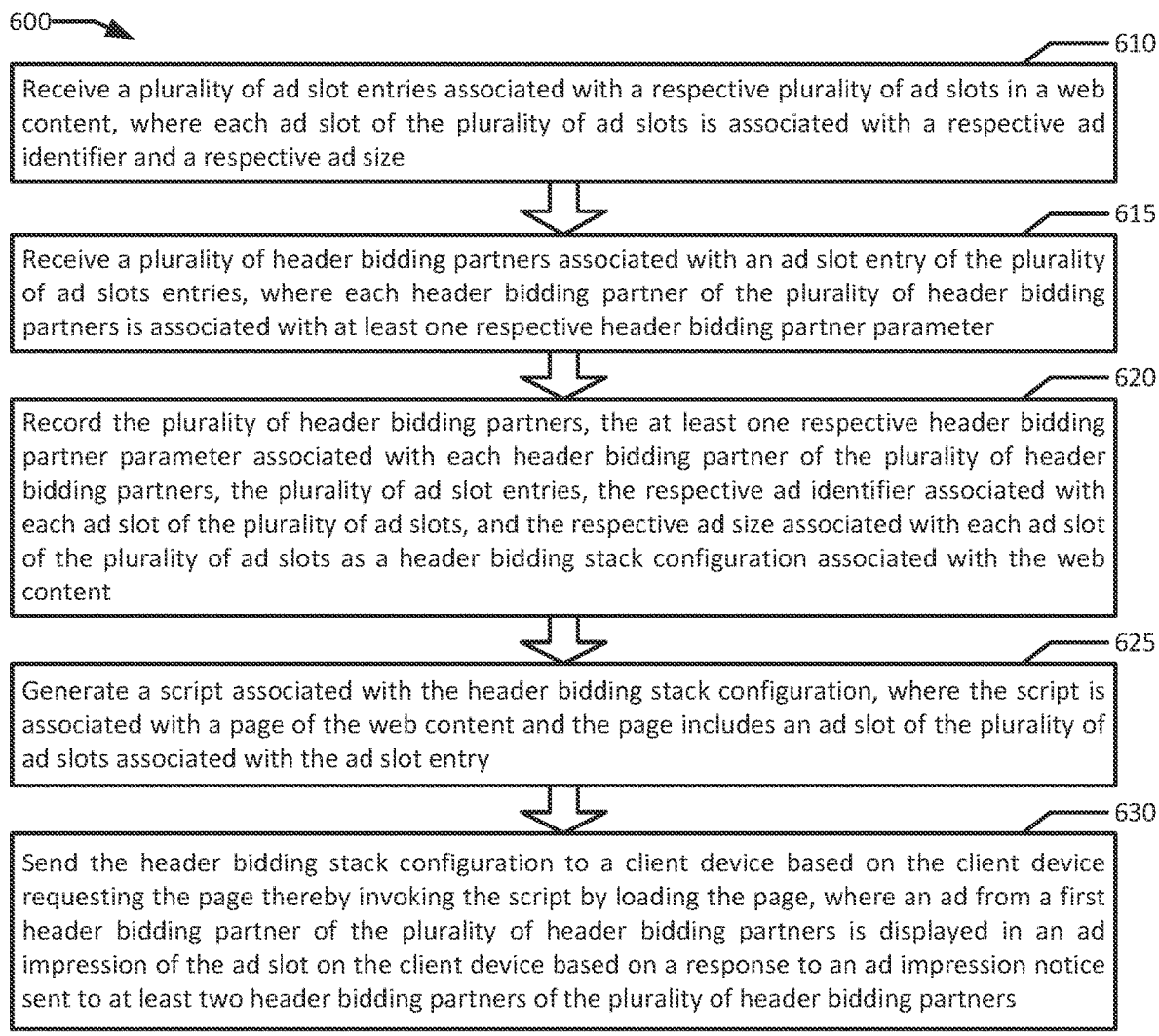
FIG. 6 is a flowchart illustrating dynamic header bidding configuration according to an example of the present disclosure.

FIG. 6 is a flowchart illustrating dynamic header bidding configuration according to an example of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both. In an example, the method is performed by configurator 140.

A plurality of ad slot entries associated with a respective plurality of ad slots in a web content is received, where each ad slot of the plurality of ad slots is associated with a respective ad identifier and a respective ad size (block 610). In an example, configurator 140 receives ad slot entries 322 and 323 associated with respective ad slots 332 and 333 in web content 162. In the example, each ad slot (e.g., ad slots 332 and 333) is associated with an ad slot identifier (e.g., a code, hexadecimal value, etc.) and an ad size (e.g., dimensions of the ad slot in pixels, duration of a video, frame rate, resolution etc.). In an example, a given ad slot (e.g., ad slot 332, 333) may have a given size, but may support ads of different formats. For example, an ad slot specified for a video ad may also display a Graphics Interchange Format ("GIF") ad, still image ad, or a still image ad with an audio track. In an example, the ad slot identifier identifies a unique ad slot—web content combination (e.g., ad slot 332 of web content 162). In an example, publisher 160 sends the configuration information through user interface module 144, which may include a graphical user interface generated by user interface module 144. In an example, ad slot entries of the same size may be configured to use the same configuration settings, thereby reducing the size of the header bidding stack configuration 152 and reducing the loading time of header bidding stack configuration 152 to a client device (e.g., client devices 170-172).

A plurality of header bidding partners associated with an ad slot entry of the plurality of ad slots entries is received, where each header bidding partner of the plurality of header bidding partners is associated with at least one respective header bidding partner parameter (block 615). In an example, publisher 160 may further send configuration information associated with header bidding partners 380A, 382A, and 384A to configurator 140 via user interface module 144. In the example, each of header bidding partners 380A, 382A, and 384A may be associated with at least one header bidding partner parameter. For example, each of header bidding partners 380A, 382A, and 384A may have an account identifier for publisher 160 that may be required to authenticate a bid and/or payment between publisher 160 and the header bidding partner (e.g., header bidding partners 380A, 382A, or 384A). In an example, header bidding partners 380A, 382A, and/or 384A may also require login or authentication information. Header bidding partners 380A, 382A, and 384A may also have bid adjustment factors specific to publisher 160. For example, enabling publisher 160 to reflect the actual value of a bid based on a discount rate negotiated with a specific header bidding partner (e.g., header bidding partners 380A, 382A, or 384A). In an example, if a first header bidding partner 380A has a 20% discount rate negotiated with publisher 160, a $1.00 bid from header bidding partner 380A may be worth less to publisher 160 than a $0.90 bid from header bidding partner 382A without a lesser discount. In an example, publisher 160 may request an addition of a second header bidding partner (e.g., header bidding partner 382A) to header bidding stack configuration 152. In an example, header bidding partner 382A may have a 10% discount. In the example, header bidding partner 380A may have an adjustment factor of 0.8 while header bidding partner 382A may have a greater adjustment factor of 0.9.

In an example, a header bidding partner parameter may include placement identifiers (e.g., placementID) and/or inventory identifiers (e.g., inventoryID). For example, inventory and placement identifiers may be configuration settings provided by a specific header bidding partner (e.g., header bidding partners 380A, 382A, or 384A) to publisher 160 for accurately identifying the ad impression being bid on by the partner. In an example, a placement identifier may be a specific header bidding partner's (e.g., header bidding partners 380A, 382A, or 384A) identifier for a specific ad slot (e.g., ad slot 332), page (e.g., page 362), web content (e.g., web content 162), and/or publisher (e.g., publisher 160). In an example, header bidding partner 380A may adjust its bidding approach based on ad slot (e.g., ad slot 332), page (e.g., page 362), web content (e.g., web content 162), and/or publisher (e.g., publisher 160). In an example, an inventory identifier may include restrictions posed by publisher 160 regarding the type and/or content of the ads that are displayed in an ad impression, for example, restricting responding ads to video or still image, and/or restricting away unwanted content in ads (e.g., violence, nudity, drugs, commercial competitors, etc.).

The plurality of header bidding partners, the at least one respective header bidding partner parameter associated with each header bidding partner of the plurality of header bidding partners, the plurality of ad slot entries, the respective ad identifier associated with each ad slot of the plurality of ad slots, and the respective ad size associated with each ad slot of the plurality of ad slots are recorded as a header bidding stack configuration associated with the web content (block 620). In an example, header bidding partners 380A, 382A, and 384A, along with their respective header bidding partner parameters, as well as ad slot entries 322 and 323, along with their associated ad identifiers and ad sizes are recorded to header bidding stack configuration 152 associated with web content 162. In an example, header bidding stack configuration 152 may be an executable script. For example, header bidding stack configuration stack configuration 152 when executed may contact header bidding partners 380A, 382A, and 384A to arrange bids on and then retrieve ads for any ad slots (e.g., ad slot 332, 333) on a page (e.g., page 362) with ad identifiers matching the ad identifiers for ad slot entry 322 and 323. In an example, storing configuration settings within an executable header bidding stack configuration 152 may improve performance by eliminating the need for logic related to parsing and loading a configuration file and then executing separate code with the information in the configuration file. In an example, less total data may be transferred to client device 170 and less processing time may be spent on client device 170 with an integrated executable header bidding stack configuration 152 as compared to a configuration only header bidding stack configuration 152.

In another example, header bidding stack configuration 152 may only include configuration settings without being executable. A non-executable header bidding stack configuration 152 may be significantly smaller than an executable header bidding stack configuration 152. In an example, the bulk of the file size for an executable header bidding stack configuration 152 may be in the executable code. In an example, if a browser or application displaying page 362 already has all of the executable code necessary to process a non-executable header bidding stack configuration 152, there may be latency and bandwidth advantages to implementing non-executable header bidding stack configurations. For example, if web content 167 by publisher 165 is a game, the game may be packaged with header bidding logic in the source code of the game. In the example, a page of the game (e.g., a loading screen) may operate more efficiently with non-executable header bidding stack configurations than executable versions. Conversely, for a website such as web content 162, there may be little assurance that a browser on, for example, client device 171 has innate capabilities to conduct header bidding for ad impressions so packaging together an executable header bidding stack configuration may be advantageous to ensure that ads are properly displayed.

In an example, ad slot 335 and ad slot 336 may have different ad identifiers. In the example, ad slot 335 may be associated with header bidding partner group 387 including header bidding partners 380B, 382B, 384B, and 386B, while ad slot 336 may be associated with header bidding partner group 385 with only header bidding partners 380B and 382B. In the example, both header bidding partner group 385 and 387 include header bidding partners 380B and 382B, but only header bidding partner group 387 includes header bidding partners 384B and 386B. In an example, header bidding partner groups 385 and 387 may be formally delineated and may be assigned to an ad slot entry (e.g., ad slot entries 325-329) as a group (e.g., based on a header bidding partner group identifier). In another example, individual header bidding partners (e.g., header bidding partners 380B, 382B, 384B, 386B) may be assigned to individual ad slot entries (e.g., ad slot entries 325-329). In an example, a same group of header bidding partners (e.g., header bidding partner group 385) may be defaulted to for every ad of a same type or size in web content 163. For example, if both ad slots 336 and 339 are video ads, they may both be defaulted to being configured with header bidding partner group 385. In the example, header bidding partner 384B may provide banner ads, but not video ads, and may therefore be added as a default for banner ads (e.g., ad slot 335, 338).

A script associated with the header bidding stack configuration is generated, where the script is associated with a page of the web content and the page includes an ad slot of the plurality of ad slots associated with the ad slot entry (block 625). In an example, script 352 associated with header bidding stack configuration 152 is generated by script engine 143 and associated with page 362 of web content 162. In the example, page 362 includes ad slot 332 associated with ad slot entry 322. In an example, script 352 may retrieve header bidding stack configuration 152 when invoked by a client device (e.g., client devices 170-172). In an example, script 352 may have limited functionality outside of retrieving header bidding stack configuration 152, for example, where header bidding stack configuration 152 is an executable code. In another example, script 352 may include header bidding instructions and/or configuration parsing functions. In an example, script 352 is included in the source code of page 362. For example, script 352 may be included in a header of page 362's HTML code. In another example, script 352 may be embedded anywhere in page 362, for example, inside the code for ad slot 332 and/or ad slot 333.

The header bidding stack configuration is sent to a client device based on the client device requesting the page thereby invoking the script by loading the page, where an ad from a header bidding partner of the plurality of header bidding partners is displayed in an ad impression of the ad slot on the client device based on a response to an ad impression notice sent to at least two header bidding partners of the plurality of header bidding partners (block 630). In an example, header bidding stack configuration 152 is sent to client device 170 based on client device 170 requesting page 362 thereby invoking script 352. In an example, an ad from header bidding partner 380A is displayed in an ad impression of ad slot 332 on client device 170 based on a response to an ad impression notice sent to header bidding partners 380A and 382A. In an example, client device 170 sends the ad impression notices to header bidding partner 380A and/or header bidding partner 382A. In an example, a single invocation of script 352 may initiate bidding for each ad slot (e.g., ad slots 332, 333) on page 362. In the example, ad slot 335 loaded to client device 170 as an ad impression may display an ad from header bidding partner 380B after ad impression notices are sent to header bidding partner group 387, while header bidding partner 384B may win an auction to display an ad in an ad impression of ad slot 336 after ad impression notices are sent to header bidding group 387. In an example, publisher 160 may access user interface module 144 to remove header bidding partner 380A from header bidding stack configuration 152. In an example, removal of header bidding partner 380A may be temporary or permanent, and may occur while publisher 160 continues to serve page 362 and web content 162. In an example, script 352 remains the same after the removal of header bidding partner 380A. In an example, script 352 remains the same after the addition of another header bidding partner.

Figure 7:
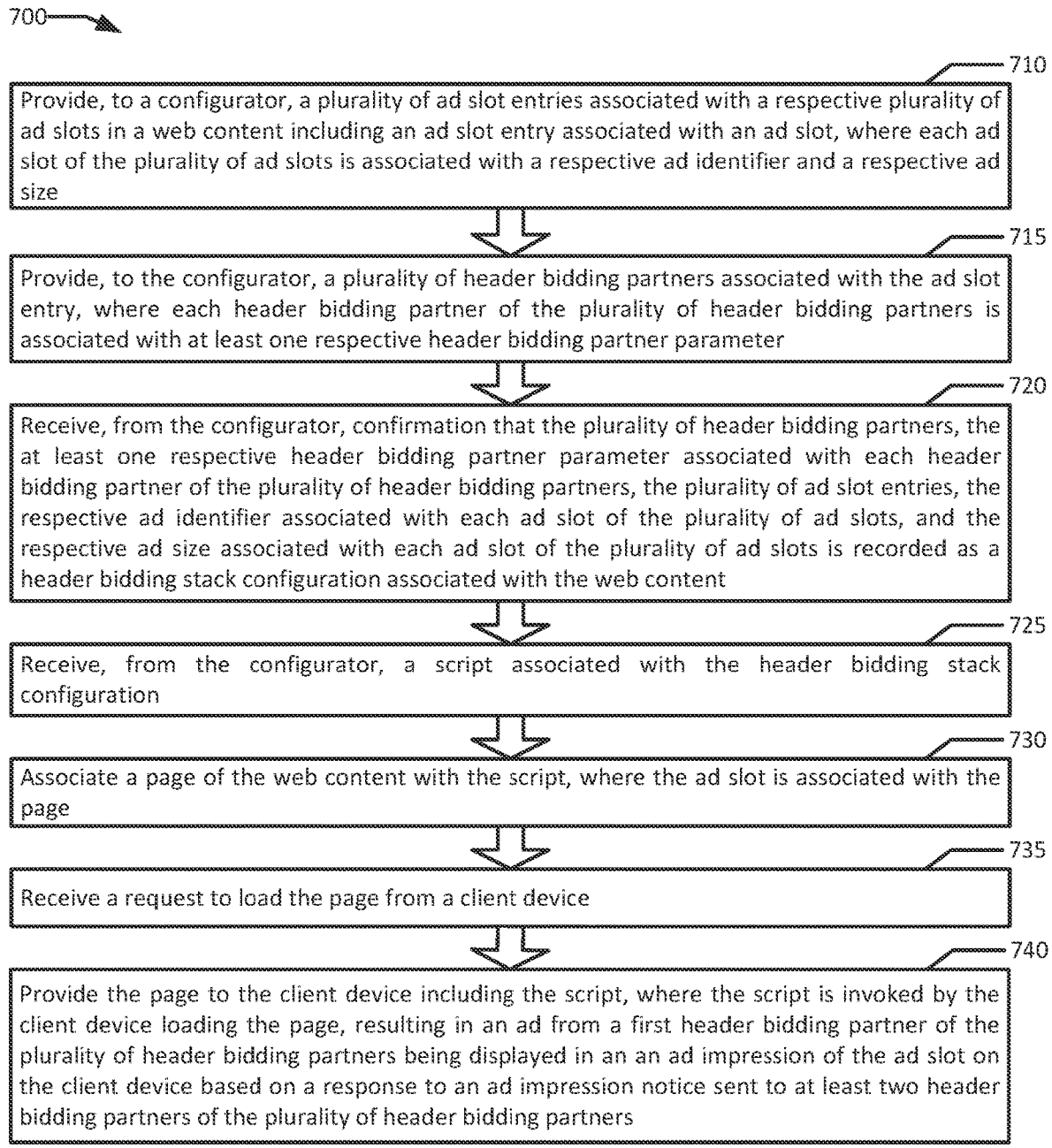
FIG. 7 is a flowchart illustrating a publisher employing dynamic header bidding configuration according to an example of the present disclosure.

FIG. 7 is a flowchart illustrating a publisher employing dynamic header bidding configuration according to an example of the present disclosure. Although the example method 600 is described with reference to the flowchart illustrated in FIG. 7, it will be appreciated that many other methods of performing the acts associated with the method 700 may be used. For example, the order of some of the blocks may be changed, certain blocks may be combined with other blocks, and some of the blocks described are optional. The method 700 may be performed by processing logic that may comprise hardware (circuitry, dedicated logic, etc.), software, or a combination of both. In an example, the method is performed by publisher 160 in conjunction with configurator 140.

A plurality of ad slot entries associated with a respective plurality of ad slots in a web content including an ad slot entry associated with an ad slot is provided to a configurator, where each ad slot of the plurality of ad slots is associated with a respective ad identifier and a respective ad size (block 710). In an example, publisher 160 provides ad slot entries 325-327 associated with ad slots 335-337 to configurator 140 (e.g., via user interface module 144), where ad slot entries 325-327 are each associated with a respective ad identifier and a respective ad size. In an example, ad identifiers and ad sizes are publisher values to ensure uniqueness of each ad slot. A plurality of header bidding partners associated with the ad slot entry are provided to the configurator, where each header bidding partner of the plurality of header bidding partners is associated with at least one respective header bidding partner parameter (block 715). In an example, header bidding partners 380B and 382B associated with ad slot entry 325 are provided to configurator 140 by publisher 160, header bidding partners 380B and 382B each being associated with one or more header bidding partner parameters. In an example, header bidding partner parameters include configuration settings specific to the header bidding partner (e.g., account information, identifiers used by the partner for bid placement, etc.).

Confirmation that the plurality of header bidding partners, the at least one respective header bidding partner parameter associated with each header bidding partner of the plurality of header bidding partners, the plurality of ad slot entries, the respective ad identifier associated with each ad slot of the plurality of ad slots, and the respective ad size associated with each ad slot of the plurality of ad slots is recorded as a header bidding stack configuration associated with the web content is received from the configurator (block 720). In an example, the publisher 160 receives confirmation that header bidding stack configuration 153 has been successfully saved by configurator 140, including header bidding partners 380B and 382B along with associated parameters, as well as ad slot entries 325-327 along with associated ad slot IDs and ad sizes. In an example, header bidding stack configuration 153 may be an executable file. In another example, header bidding stack configuration 153 may be a configuration file that feeds configuration information into a separate executable program. A script associated with the header bidding stack configuration is received from the configurator (block 725). In an example, publisher 160 receives a script 353 from configurator 140 after header bidding stack configuration 153 is saved. A page of the web content is associated with the script, where the ad slot is associated with the page (block 730). In an example, page 363 of web content 163 is associated with script 353, with ad slot 335 associated with page 363. In an example, one copy of script 353 may be embedded in page 363 populated all of the ad slots (e.g., ad slots 335-337) on page 363. In an example, script 353 may be the same script as script 354, where both pages 363 and 364 are pages of web content 163.

A request to load the page from a client device is received (block 735). In an example, publisher 160 receives a request to load page 363 from client device 170. The page is provided to the client device including the script, where the script is invoked by the client device loading the page, resulting in an ad from a first header bidding partner of the plurality of header bidding partners being displayed in an ad impression of the ad slot on the client device based on a response to an ad impression notice sent to at least two header bidding partners of the plurality of header bidding partners (block 740). In an example, page 363, including script 353 is provided to client device 170 and script 353 is invoked by client device 170 when client device 370 loads page 363. As a result, an ad from header bidding partner 380B is displayed in an ad impression of ad slot 335 on client device 170 based on a response from header bidding partner 380B to an ad impression notice sent to header bidding partners 380B and 382B.

In an example, web content 163 remains available on publisher 160 while publisher 160 updates header bidding stack configuration 153. In the example, publisher 160 accesses header bidding stack configuration 153 through user interface module 144 of configurator 140. Header bidding partner 384B may then be added to header bidding partners 380B and 382B in header bidding stack configuration 153. In an example, header bidding partner 384B may be associated with ad slot entry 325 and header bidding stack configuration 153 may be saved. In an example, publisher 160 may receive a second request to load page 363 this time from client device 171. In the example, page 363 is provided to client device 171, and after client device 171 conducts an auction, an ad from header bidding partner 384B is displayed by client device 171 in an ad impression of ad slot 335 on page 363 rendered by client device 171.

In an example, script 353 is associated with ad slot 336 in addition to ad slot 335, and ad slot 336 has a different ad size from ad slot 335. For example, ad slot 336 may be a banner ad at the top of a page while ad slot 335 may be a popup ad in the foreground of a page. In an example, ad slot 336 may be an image ad while ad slot 335 may support video ads. In an example, ad slots 335 and 336 may support ads of any suitable format. In an example, ad slot entry 325 and associated ad slot 335 may be associated with header bidding partners 380B and 382B, while ad slot entry 326 and ad slot 336 may be associated with different header bidding partners 384B and 386B. In the example, invoking script 353 may cause an ad from header bidding partner 382B to be displayed in an ad impression of ad slot 335, while an ad from header bidding partner 386B may be displayed in an ad impression of ad slot 336 on client device 170. In an example, auction module 147 may send ad impression notices to one or more of the header bidding partners associated with ad slot 335 (e.g., header bidding partners 380B and 382B), and the auction module 147 may send an ad impression response to client device 170 with a winner as between header bidding partners 380B and 382B. In an example, the winning bid between header bidding partners 380B and 382B may be an entry into a second round of bidding with additional partners. In an example, certain advertisers may negotiate for a final bid opportunity to outbid a winner of a header bidding auction.

Figure 8:
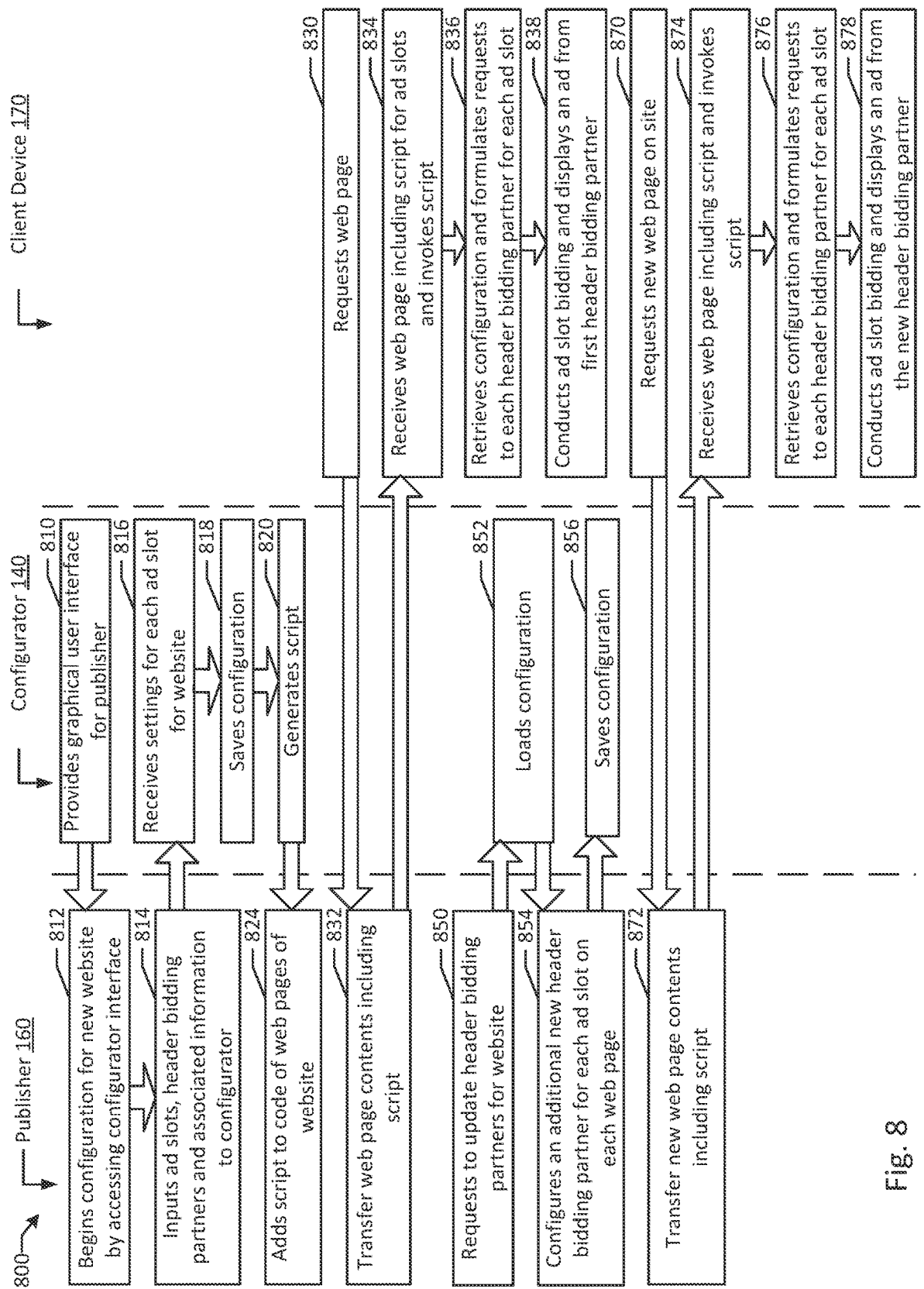
FIG. 8 is a flow diagram illustrating dynamic header bidding configuration according to an example of the present disclosure.

FIG. 8 is a flow diagram illustrating dynamic header bidding configuration according to an example of the present disclosure. Although the examples below are described with reference to the flowchart illustrated in FIG. 8, it will be appreciated that many other methods of performing the acts associated with FIG. 8 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 800, a publisher and configurator 140 combine to perform dynamic header bidding configuration for displaying an ad via header bidding on client device 170.

In system 800 as illustrated in FIG. 8, configurator 140 provides a graphical user interface for publisher 160 via user interface module 144 (block 810). In an example, publisher 160 may begin configuration for a new website (e.g., web content 163) by accessing user interface module 144 of configurator 140 (block 812). Publisher 160 may then input ad slots 335-339 as ad slot entries 325-329 along with associated respective ad identifiers and ad sizes, as well as header bidding partners 380B and 382B along with associated header bidding partner parameters into configurator 170 (block 814). In an example, configurator 140 receives the settings for ad slots 335-339 for web content 163 (block 816). Configurator 140 (e.g., via configuration engine 145) may then save header bidding stack configuration 153 (block 818). In an example, configurator 140 (e.g., via script engine 143) may generate script 353 associated with header bidding stack configuration 153 (block 820). In an example, publisher 160 adds script 353 to the source code of page 363 and script 354 (e.g., a second copy of script 353) to the source code of page 364 (block 822).

In an example, client device 170 may request page 363 (block 830). In the example, publisher 160 transfers page 363's contents including script 353 to client device 170 (block 832). In an example, client device 170 receives page 363 including script 353 and invokes script 353 (block 834). In an example, client device 170 retrieves header bidding stack configuration 153 and formulates ad impression notifications to header bidding partners 380B and 382B for ad impressions of each of ad slots 335-337 (block 836). In an example, header bidding stack configuration 153 may execute as an executable file once loaded by client device 170 and may conduct a header bidding auction for each ad impression on page 362 based on an ad slot identifier for each of ad slots 335-337 associated with the ad impressions. For example, an ad impression of ad slot 335 may include ad slot 335's ad identifier, which may then be used as a key by header bidding stack configuration 153 to conduct a header bidding auction with the configured header bidding partners (e.g., header bidding partners 380B and 382B) with for an ad of the correct ad size and type. In an example, client device 170 conducts ad slot bidding and displays an ad from header bidding partner 380B on page 363 (block 838).

After page 362 is transferred to client device 170, publisher 160 may request to update header bidding partners for the website (e.g., web content 163) (block 850). In an example, configurator 140 loads header bidding stack configuration 153 into user interface module 144 (block 852). In the example, publisher 160 may add header bidding partner 384B to ad slots 335-339 by updating ad slot entries 325-329 on pages 363 and 364 (block 854). In an example, configurator 140 then saves header bidding stack configuration 153 (block 856).

In an example, after accessing page 363, client device 170 requests page 364 on web content 163 (block 870). In an example, publisher 160 transfers the contents of page 364 to client device 170 including script 354 (block 872). In an example, since web content 163 remained active and online during the update of header bidding stack configuration 153, script 354 remains unchanged and is still the same as the copy of script 353 previously executed by client device 170 to start header bidding for ads for page 363. In an example, client device 170 receives page 364 including script 354 and invokes script 354 (block 874). In an example, by invoking script 354, client device 170 retrieves header bidding stack configuration 153 and formulates ad impression notifications to header bidding partners 380B, 382B, and also 384B for ad impressions of each of ad slots 338-339 (block 876). In an example, client device 170 conducts ad slot bidding and displays an ad from header bidding partner 384B on page 363 (block 878).

Figure 9:
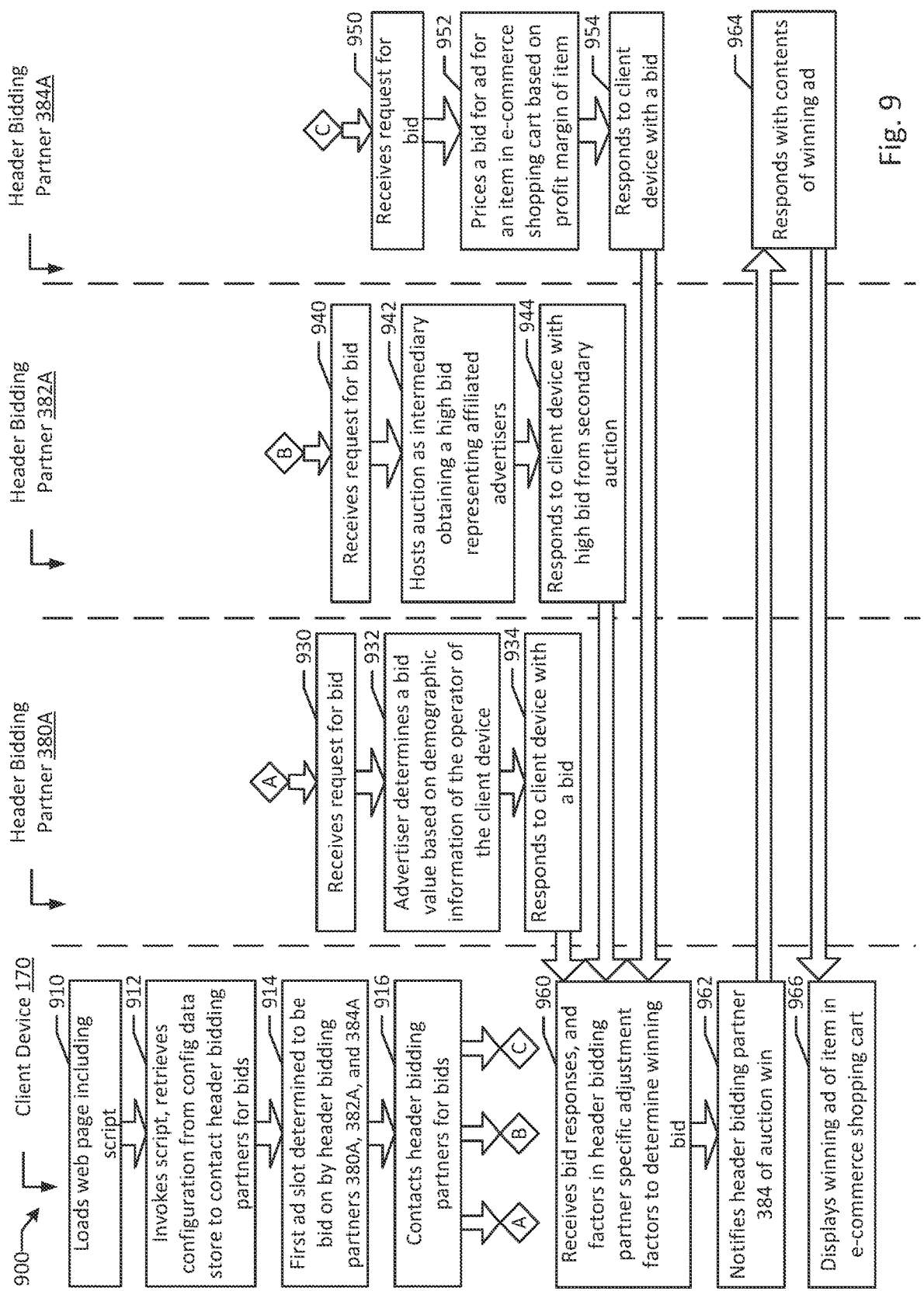
FIG. 9 is a flow diagram illustrating configuration of an ad with dynamic header bidding configuration being displayed on a client device according to an example of the present disclosure.

FIG. 9 is a flow diagram illustrating configuration of an ad with dynamic header bidding configuration being displayed on a client device according to an example of the present disclosure. Although the examples below are described with reference to the flowchart illustrated in FIG. 9, it will be appreciated that many other methods of performing the acts associated with FIG. 9 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 900, a client device 170, conducts a header bidding auction with header bidding partners 380A, 382A, and 384A.

In system 900 as illustrated in FIG. 9, client device 170 loads page 462 of web content 162 including script 352 from publisher 160 (block 910). In an example, client device 170 invokes script 352 retrieving header bidding stack configuration 152 from configuration data store 150 to contact header bidding partners 380A, 382A, and 384A for bids on ad impressions 432 and 433 on page 462 (block 912). In an example, client device 170 determines that ad slot 332 loaded to client device 170 as ad impression 432, is configured for bidding by header bidding partners 380A, 382A, and 384A (block 914). In an example, client device 170 contacts header bidding partners 380A, 382A, and 384A for bids on ad impression 432 (block 916).

In an example, header bidding partner 380A receives an ad impression notice from client device 170 as a request for a bid on ad impression 432 (block 930). In the example, header bidding partner 380A determines a bid value based on demographic information of an operator of client device 170 (block 932). For example, the ad impression notice sent by client device 170 to header bidding partner 380A may include demographic information of client device 170's user (e.g., in a web cookie). In an example, header bidding partner 380A responds to client device 170 with a bid (block 934). In an example, header bidding partner 382A also receives an ad impression notice from client device 170 as a request for a bid on ad impression 432 (block 940). In the example, header bidding partner 382A hosts an auction as an intermediary with affiliated advertisers, obtaining a high bid representing header bidding partner 382A's affiliated advertisers (block 942). In the example, header bidding partner 382A responds to client device 170 with the high bid from the secondary auction conducted by header bidding partner 382A (block 944). In an example, header bidding partner 384A also receives an ad impression notice from client device 170 as a request for a bid on ad impression 432 (block 950). In the example, header bidding partner 384A may represent an e-commerce site and may price a bid for ad impression 432 based on an item that the user of client device 170 left in a shopping cart on the e-commerce site, for example, header bidding partner 384A may price its bid based on a profit margin of the item in the shopping cart (block 952). In the example, header bidding partner 384A may respond to client device 170 with a third bid for ad impression 432 (block 954).

In an example, client device 170 may receive three bid responses from header bidding partners 380A, 382A, and 384A, and may then factor in partner specific adjustment factors for each of header bidding partners 380A, 382A, and 384A onto the received bids to determine a winning bid to ad impression 432 (block 960). For example, header bidding partner 380A may have a 15% discount rate, header bidding partner 382A may have a 10% discount rate, and header bidding partner 384A may have an 18% discount rate. In an example, client device 170 notifies header bidding partner 384A that header bidding partner 384A won the auction for ad impression 432 (block 962). In an example, header bidding partner 384A wins even with the most discounted rate due to a high profit margin on the items in the user's shopping cart yielding a high bid from header bidding partner 384A. In an example, header bidding partner 384A responds with the contents of the winning ad (block 964). In an example, client device 170 displays the winning ad to remind the user of client device 170 of the item in the user's e-commerce shopping cart in ad impression 432 (block 966).

Figure 10:
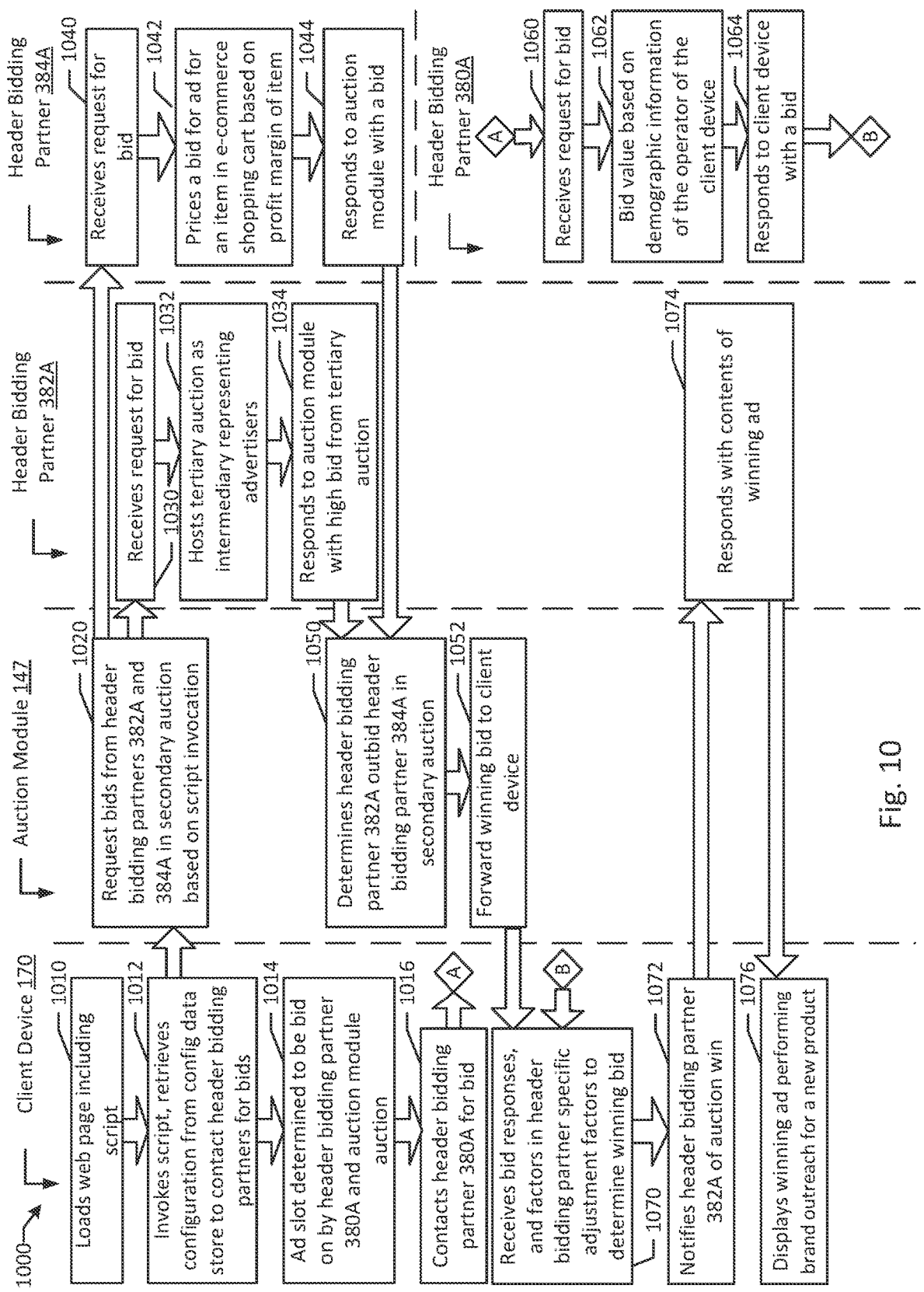
FIG. 10 is a flow diagram illustrating configuration of an ad with dynamic header bidding configuration with a secondary auction being displayed on a client device according to an example of the present disclosure.

FIG. 10 is a flow diagram illustrating configuration of an ad with dynamic header bidding configuration with a secondary auction being displayed on a client device according to an example of the present disclosure. Although the examples below are described with reference to the flowchart illustrated in FIG. 10, it will be appreciated that many other methods of performing the acts associated with FIG. 10 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 1000, a client device 170, conducts a header bidding auction with header bidding partners 380A, 382A, and 384A, including a secondary auction conducted by auction module 147.

In system 1000 as illustrated in FIG. 10 client device 170 loads page 562 of web content 162 including script 352 from publisher 160 (block 1010). In an example, client device 170 invokes script 552 (e.g., a local copy of script 352) retrieving header bidding stack configuration 152 from configuration data store 150 to contact header bidding partners 380A, 382A, and 384A for bids on ad impressions 532 and 533 on page 462 (block 1012). In an example, ad slot 332 (e.g., ad impression 532 in loaded page 562) is determined to be configured to be bid on by header bidding partners 380A as well as a secondary auction conducted by auction module 147 (block 1014). In an example, client device 170 contacts header bidding partners 380A for a bid on ad impression 532 (block 1016).

In an example, upon script 552 being invoked to retrieve header bidding stack configuration 152 from configuration store 150, auction module 137 is notified to conduct a secondary auction, and to request bids from header bidding partners 382A and 384A (block 1020). In an example, configuration store 150 notifies auction module 137 to begin conducting the secondary auction. In such an example, latency is reduced since configuration store 150 may be collocated with configurator 140 and thus auction module 147, thereby resulting in very fast notifications (e.g., under 5 ms). In an example, client device 170 may notify auction module 137 to conduct a secondary auction as if auction module 137 were another header bidding partner. For example, auction module 137 may support other types of advertisement auctions such as OpenRTB bidding not supported by client side header bidding protocols. In an example, a given auction (e.g., a header bidding auction conducted by client device 170) may nest another auction (e.g., an auction by auction module 137). In such examples, several layers of nested auctions may be initiated for a given ad impression (e.g., ad impression 532).

In an example, header bidding partner 382A also receives an ad impression notice from auction module 147 as a request for a bid on ad impression 532 (block 1030). In the example, header bidding partner 382A hosts a tertiary auction as an intermediary representing affiliated advertisers, obtaining a high bid representing header bidding partner 382A's affiliated advertisers (block 1032). In the example, header bidding partner 382A responds to auction module 147 with the high bid from the tertiary auction conducted by header bidding partner 382A (block 1034). In an example, header bidding partner 384A also receives an ad impression notice from auction module 147 as a request for a bid on ad impression 532 (block 1040). In the example, header bidding partner 384A may represent an e-commerce site and may price a bid for ad impression 532 based on an item that the user of client device 170 left in a shopping cart on the e-commerce site, for example, header bidding partner 384A may price its bid based on a profit margin of the item in the shopping cart (block 1042). In the example, header bidding partner 384A may respond to auction module 147 with a third bid for ad impression 532 (block 1044). In an example, auction module 147 receives bids from header bidding partners 382A and 384A, and determines that header bidding partner 382A outbid header bidding partner 384A in auction module 147's secondary auction (block 1050). In an example, auction module 147 may forward the winning bid from header bidding partner 382A to client device 170 (block 1052). In an example, auction module 147 may conduct a secondary auction with minimal latency overhead as compared to a direct auction by client device 170. For example, auction module 147 may be collocated in the same data center as one or more of header bidding partners 382A and 384A, thereby saving significantly on round trip network latency for exchanging auction messages with header bidding partners 382A and 384A as compared to a direct auction by client device 170. For example, request to header bidding partner 382A from client device 170 may take 100 ms in network transmission time while the same request from auction module 147 may take under 10 ms in network transmission time. In addition auction module 147 may enable publisher 160 to access advertisers deploying bidding frameworks that are not supported by client side header bidding protocols. In an example, auction module 147 may include additional header bidding partners and or other advertising partners in auction module 147's secondary auction.

In an example, header bidding partner 380A receives an ad impression notice from client device 170 as a request for a bid on ad impression 532 (block 1060). In the example, header bidding partner 380A determines a bid value based on demographic information of an operator of client device 170 (block 1062). For example, the ad impression notice sent by client device 170 to header bidding partner 380A may include demographic information of client device 170's user (e.g., in a web cookie). In an example, header bidding partner 380A responds to client device 170 with a bid (block 1064).

In an example, client device 170 may receive two bid responses, one from header bidding partner 380A, and one from auction module 147, and client device 170 and may then factor in partner specific adjustment factors for each of header bidding partners 380A and 382A onto the received bids to determine a winning bid to ad impression 532 (block 1070). In an example, client device 170 notifies header bidding partner 382A that header bidding partner 382A won the auction for ad impression 532 (block 1072). In an example, header bidding partner 382A responds with the contents of the winning ad (block 1074). In an example, client device 170 displays the winning ad placed by an affiliated brand of header bidding partner 382A performing brand outreach for a new product in ad impression 532 (block 966).

By enabling dynamic header bidding configuration, ad delivery latency during outages by header bidding partners may be improved by upwards of 70% (e.g., 80%). For example, a typical header bidding auction exchange may take 200 ms, but may have a timeout value of 1000 ms. By allowing a publisher to quickly remove troubled header bidding partners from their content, 800 ms of latency may therefore be saved for a user loading the publisher's content. In addition, by enabling secondary auctions through the configurator via an auction module, the universe of potential advertisers is greatly increased by allowing the auction module to translate ad impression notices into formats compatible with a wide array of auction platforms. Publishers also gain the flexibility of being able to more easily experiment with new advertising partners by allowing the publishers to try the new advertising partners without risking a system wide outage to remove the new partner if the relationship does not work. In addition, due to the nature of an auction system, it is often extremely difficult to detect a configuration error in a specific ad slot in large web sites. For example, a typical web page may have ten to twenty ad slots, and a typical web site may have one hundred or more web pages. Out of, for example, two thousand ad slots in a given web site, if a few ad slots have incorrect configurations for some of their header bidding partners, those erroneous configurations may well never be detected. Unless an entire configuration is erroneous, typically at least one partner will still supply an ad even if every other partner rejects an erroneous bid request. Monitoring the web site as a whole, a publisher may simply assume that the advertisers with erroneous configurations were being out performed in the auctions. By configuring partner settings uniformly via the configurator, an erroneous configuration will be immediately apparent because that partner will never respond to an auction, thereby reducing the chances that messages and bids will be lost.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of configuring header bidding advertisement slots comprising:
   a memory;
   one or more processors communicatively coupled with the memory;
   a network; and
   a configurator executing on the one or more processors including a user interface module, a configuration engine, and a script engine;
   wherein the one or more processors execute to:
   receive, by the user interface module, a plurality of ad slot entries associated with a respective plurality of ad slots in a web content, wherein each ad slot of the plurality of ad slots is associated with a respective ad identifier and a respective ad size;
   receive, by the user interface module, a first plurality of header bidding partners associated with a first ad slot entry of the plurality of ad slots entries, wherein each header bidding partner of the first plurality of header bidding partners is associated with at least one respective header bidding partner parameter;
   record, by the configuration engine, the first plurality of header bidding partners, the at least one respective header bidding partner parameter associated with each header bidding partner of the first plurality of header bidding partners, the plurality of ad slot entries, the respective ad identifier associated with each ad slot of the plurality of ad slots, and the respective ad size associated with each ad slot of the plurality of ad slots as a header bidding stack configuration associated with the web content;
   generate, by the script engine, a script associated with the header bidding stack configuration, wherein the script is associated with a first page of the web content and the first page includes a first ad slot of the plurality of ad slots associated with the first ad slot entry;
   send the header bidding stack configuration to a client device based on the client device requesting the first page thereby invoking the script by loading the first page, wherein a first ad from a first header bidding partner of the first plurality of header bidding partners is displayed in a first ad impression of the first ad slot on the client device based on a response to a first ad impression notice sent to at least the first header bidding partner and a second header bidding partner of the first plurality of header bidding partners, wherein the first ad is displayed a first time period after the first ad impression notice is sent; and
   remove the second header bidding partner from the header bidding stack configuration, wherein a second ad impression notice is sent after the removal of the second header bidding partner, a second ad is displayed based on a response to the second ad impression notice, and a second time period between the second ad impression notice being sent and the second ad being displayed is shorter than the first time period.

2. The system of claim 1, wherein a first header bidding partner parameter includes at least one of a placement identifier and an inventory identifier.

3. The system of claim 1, wherein the first header bidding partner is associated with a first adjustment factor, the second header bidding partner is associated with a second adjustment factor, and the first adjustment factor is greater than the second adjustment factor.

4. The system of claim 1, wherein the user interface module generates a graphical user interface.

5. The system of claim 1, wherein the script is included in a source code of the first page.

6. The system of claim 1, wherein the user interface module requests removal of the first header bidding partner from the header bidding stack configuration.

7. The system of claim 1, wherein the user interface module requests addition of a third header bidding partner to the first plurality of header bidding partners in the first header bidding stack configuration.

8. The system of claim 1, wherein a second ad slot of the plurality of ad slots is associated with a second plurality of header bidding partners, and the second ad slot has a different ad identifier from the first ad slot.

9. The system of claim 8, wherein the first header bidding partner and the second header bidding partner are in both the first plurality of header bidding partners and the second plurality of header bidding partners, and
the second plurality of header bidding partners includes a third header bidding partner excluded from the first plurality of header bidding partners.

10. The system of claim 8, wherein invoking the script causes a third ad from a third header bidding partner of the second plurality of header bidding partners to be displayed in a second impression associated with the second ad slot on the client device based on responses to a second ad impression notice sent to at least two of the header bidding partners of the second plurality of header bidding partners.

11. The system of claim 1, wherein the first ad impression notice is sent to the first header bidding partner by an auction module.

12. The system of claim 11, wherein the auction module forwards an ad impression response from the first header bidding partner to the client device.

13. The system of claim 11, wherein the auction module additionally sends the first ad impression notice to a third header bidding partner, and the auction module forwards an ad impression response from the third header bidding partner to the client device.

14. The system of claim 1, wherein the first ad impression notice is sent by the client device.

15. A method of configuring header bidding advertisement slots comprising:
providing, to a configurator, a plurality of ad slot entries associated with a respective plurality of ad slots in a web content including an ad slot entry associated with an ad slot,
wherein each ad slot of the plurality of ad slots is associated with a respective ad identifier and a respective ad size;
providing, to the configurator, a plurality of header bidding partners, including at least a first header bidding partner and a second header bidding partner, associated with the ad slot entry, wherein each header bidding partner of the plurality of header bidding partners is associated with at least one respective header bidding partner parameter;
receiving, from the configurator, confirmation that the plurality of header bidding partners, the at least one respective header bidding partner parameter associated with each header bidding partner of the plurality of header bidding partners, the plurality of ad slot entries, the respective ad identifier associated with each ad slot of the plurality of ad slots, and the respective ad size associated with each ad slot of the plurality of ad slots is recorded as a header bidding stack configuration associated with the web content;
receiving, from the configurator, a script associated with the header bidding stack configuration;
associating a page of the web content with the script, wherein the ad slot is associated with the page;
receiving a first request to load the page from a first client device;
providing the page to the first client device including the script, wherein the script is invoked by the first client device loading the page, resulting in a first ad from the first header bidding partner being displayed in a first ad impression of the ad slot on the first client device based on a response to a first ad impression notice sent to at least the first header bidding partner and the second header bidding partners, wherein the first ad is displayed a first time period after the first ad impression notice is sent; and
removing the second header bidding partner from the header bidding stack configuration, wherein a second ad impression notice is sent after the removal of the second header bidding partner, a second ad is displayed based on a response to the second ad impression notice, and a second time period between the second ad impression notice being sent and the second ad being displayed is shorter than the first time period.

16. The method of claim 15, wherein the web content remains available while updating the header bidding stack configuration by:
accessing the header bidding stack configuration through a user interface of the configurator;
adding a second header bidding partner to the plurality of header bidding partners;
associating the second header bidding partner with the ad slot entry;
saving the header bidding stack configuration;
receiving a second request to load the page from a second client device; and
providing the page to the second client device including the script, wherein a second ad from the second header bidding partner is displayed in a second ad impression of the ad slot on the page by the second client device.

17. A method of configuring header bidding advertisement slots comprising:
receiving a plurality of ad slot entries associated with a respective plurality of ad slots in a web content, wherein each ad slot of the plurality of ad slots is associated with a respective ad identifier and a respective ad size;
receiving a first plurality of header bidding partners associated with a first ad slot entry of the plurality of ad slots entries, wherein each header bidding partner of the first plurality of header bidding partners is associated with at least one respective header bidding partner parameter;
recording the first plurality of header bidding partners, the at least one respective header bidding partner parameter associated with each header bidding partner of the first plurality of header bidding partners, the plurality of ad slot entries, the respective ad identifier associated with each ad slot of the plurality of ad slots, and the respective ad size associated with each ad slot of the plurality of ad slots as a header bidding stack configuration associated with the web content;
generating a script associated with the header bidding stack configuration, wherein the script is associated with a page of the web content and the page includes a first ad slot of the plurality of ad slots associated with the first ad slot entry;

sending the header bidding stack configuration to a client device based on the client device requesting the page thereby invoking the script by loading a first page, wherein a first ad from a first header bidding partner of the first plurality of header bidding partners is displayed in a first ad impression of the first ad slot on the client device based on a response to a first ad impression notice sent to at least the first header bidding partner and a second header bidding partner of the first plurality of header bidding partners, wherein the first ad is displayed a first time period after the first ad impression notice is sent; and removing the second header bidding partner from the header bidding stack configuration, wherein a second ad impression notice is sent after the removal of the second header bidding partner, a second ad is displayed based on a response to the second ad impression notice, and a second time period between the second ad impression notice being sent and the second ad being displayed is shorter than the first time period.

18. The method of claim 17, wherein the script is associated with a second ad slot of the plurality of ad slots, and the second ad slot has a different ad size from the first ad slot.

19. The method of claim 18, wherein the second ad slot is associated with a second plurality of header bidding partners different from the first plurality of header bidding partners, and invoking the script causes a third ad from a third header bidding partner of the second plurality of header bidding partners to be displayed in a second ad impression associated with the second ad slot on the client device.

20. The system of claim 17, wherein the first ad impression notice is sent to the first header bidding partner and the second header bidding partner by an auction module, and the auction module then sends an ad impression response to the client device.

21. A computer-readable non-transitory storage medium storing executable instructions of configuring header bidding advertisement slots, which when executed by a computer system, cause the computer system to:

receive a plurality of ad slot entries associated with a respective plurality of ad slots in a web content, wherein each ad slot of the plurality of ad slots is associated with a respective ad identifier and a respective ad size;

receive a plurality of header bidding partners associated with a ad slot entry of the plurality of ad slots entries, wherein each header bidding partner of the plurality of header bidding partners is associated with at least one respective header bidding partner parameter;

record the plurality of header bidding partners, the at least one respective header bidding partner parameter associated with each header bidding partner of the plurality of header bidding partners, the plurality of ad slot entries, the respective ad identifier associated with each ad slot of the plurality of ad slots, and the respective ad size associated with each ad slot of the plurality of ad slots as a header bidding stack configuration associated with the web content;

generate a script associated with the header bidding stack configuration, wherein the script is associated with a page of the web content and the page includes an ad slot of the plurality of ad slots associated with the ad slot entry;

send the header bidding stack configuration to a client device based on the client device requesting the page thereby invoking the script by loading the page, wherein an ad from a first header bidding partner of the plurality of header bidding partners is displayed in an ad impression of the ad slot on the client device based on a response to a first ad impression notice sent to at least the first header bidding partner and a second header bidding partner of the plurality of header bidding partners, wherein the first ad is displayed a first time period after the first ad impression notice is sent; and remove the second header bidding partner from the header bidding stack configuration, wherein a second ad impression notice is sent after the removal of the second header bidding partner, a second ad is displayed based on a response to the second ad impression notice, and a second time period between the second ad impression notice being sent and the second ad being displayed is shorter than the first time period.

* * * * *